(12) United States Patent
Bovenschulte et al.

(10) Patent No.: US 7,890,490 B1
(45) Date of Patent: Feb. 15, 2011

(54) SYSTEMS AND METHODS FOR PROVIDING ADVANCED INFORMATION SEARCHING IN AN INTERACTIVE MEDIA GUIDANCE APPLICATION

(75) Inventors: David Bovenschulte, River Vale, NJ (US); Edgar Fereira, Stamford, CT (US); Robin Haffner, New York, NY (US); Jay S. Bryant, West Windsor, NJ (US)

(73) Assignee: United Video Properties, Inc., Hollywood, CA (US)

( * ) Notice: Subject to any disclaimer, the term of this patent is extended or adjusted under 35 U.S.C. 154(b) by 158 days.

(21) Appl. No.: 11/479,745

(22) Filed: Jun. 30, 2006

(51) Int. Cl.
*G06F 7/08* (2006.01)
*G06F 17/21* (2006.01)
*G06F 17/30* (2006.01)

(52) U.S. Cl. ...................... 707/708; 707/731
(58) Field of Classification Search ............... 707/104.1, 707/5, 999.104, 999.005, 708, 731
See application file for complete search history.

(56) References Cited

U.S. PATENT DOCUMENTS

| | | | |
|---|---|---|---|
| 4,081,753 A | 3/1978 | Miller | |
| 4,170,782 A | 10/1979 | Miller | |
| 4,271,532 A | 6/1981 | Wine | |
| 4,367,559 A | 1/1983 | Tults | |
| 4,375,651 A | 3/1983 | Templin et al. | |
| 4,381,522 A | 4/1983 | Lambert | |
| 4,390,901 A | 6/1983 | Keiser et al. | |
| 4,425,579 A | 1/1984 | Merrell | |
| 4,429,385 A | 1/1984 | Cichelli et al. | |
| 4,495,654 A | 1/1985 | Deiss | |

(Continued)

FOREIGN PATENT DOCUMENTS

DE    42 40 187    6/1994

(Continued)

OTHER PUBLICATIONS

TV Guide website www.tvguide.com, web pages dated Dec. 17, 2001, Aug. 29, 2002, Sep. 6, 2002, Jun. 22, 2003, and Apr. 28, 2005 via The Wayback Machine www.archive.org.*

(Continued)

*Primary Examiner*—James Trujillo
*Assistant Examiner*—Bruce M Moser
(74) *Attorney, Agent, or Firm*—Ropes & Gray LLP

(57) ABSTRACT

The present invention relates to an interactive media guidance application that provides improved searching functionality for media information, such as media program listings, media programming information, celebrity information, and other related media information. Search objects may be defined in the entertainment context and applied to media information to enable efficient searching. Different types of media information may be categorized to enable proper organization of search results. A search object query may be performed based on a user entered search expression and the results may be a vertical slice through the organized categories of media information. User submitted tags may also be applied to the media information and used to search the media information. Atomic searching may be enabled for more generic search expressions, whereby an atomic search object is associated with a personalized atomic search algorithm comprised of individual searches. The search algorithm is determined by receiving both user metrics and editorial input. Context sensitive searching may also be provided by defining search objects with different context settings and determining a context setting of the user initiated search.

50 Claims, 19 Drawing Sheets

U.S. PATENT DOCUMENTS

| | | |
|---|---|---|
| 4,527,194 A | 7/1985 | Sirazi |
| 4,641,205 A | 2/1987 | Beyers, Jr. |
| 4,689,022 A | 8/1987 | Peers et al. |
| 4,706,121 A | 11/1987 | Young |
| 4,754,326 A | 6/1988 | Kram et al. |
| 4,908,713 A | 3/1990 | Levine |
| 4,963,994 A | 10/1990 | Levine |
| 5,038,211 A | 8/1991 | Hallenbeck |
| 5,047,867 A | 9/1991 | Strubbe et al. |
| 5,075,771 A | 12/1991 | Hashimoto et al. |
| 5,210,611 A | 5/1993 | Yee et al. |
| 5,223,924 A | 6/1993 | Strubbe |
| 5,317,403 A | 5/1994 | Keenan |
| 5,323,240 A | 6/1994 | Amano et al. |
| 5,410,344 A | 4/1995 | Graves et al. |
| 5,432,561 A | 7/1995 | Strubbe |
| 5,444,499 A | 8/1995 | Saitoh et al. |
| 5,465,113 A | 11/1995 | Gilboy |
| 5,465,385 A | 11/1995 | Ohga et al. |
| 5,477,262 A | 12/1995 | Banker et al. |
| 5,479,266 A | 12/1995 | Young et al. |
| 5,481,296 A | 1/1996 | Cragun et al. |
| 5,483,278 A | 1/1996 | Strubbe et al. |
| 5,517,605 A | 5/1996 | Wolf |
| 5,534,911 A | 7/1996 | Levitan |
| 5,585,866 A | 12/1996 | Miller et al. |
| 5,589,892 A | 12/1996 | Knee et al. |
| 5,600,364 A | 2/1997 | Hendricks et al. |
| 5,614,940 A | 3/1997 | Cobbley et al. |
| 5,617,565 A | 4/1997 | Augenbraun et al. |
| 5,621,456 A | 4/1997 | Florin et al. |
| 5,629,733 A | 5/1997 | Youman et al. |
| 5,659,742 A | 8/1997 | Beattie et al. |
| 5,694,176 A | 12/1997 | Bruette et al. |
| 5,696,869 A | 12/1997 | Abecassis |
| 5,731,844 A | 3/1998 | Rauch et al. |
| 5,734,886 A | 3/1998 | Grosse et al. |
| 5,742,816 A | 4/1998 | Barr et al. |
| 5,751,286 A | 5/1998 | Barber et al. |
| 5,752,160 A | 5/1998 | Dunn |
| 5,774,357 A | 6/1998 | Hoffberg et al. |
| 5,798,785 A | 8/1998 | Hendricks et al. |
| 5,801,747 A | 9/1998 | Bedard |
| 5,801,787 A | 9/1998 | Schein et al. |
| 5,812,134 A | 9/1998 | Pooser et al. |
| 5,822,123 A | 10/1998 | Davis et al. |
| 5,848,396 A | 12/1998 | Gerace |
| 5,850,218 A | 12/1998 | LaJoie et al. |
| 5,867,226 A | 2/1999 | Wehmeyer et al. |
| 5,875,108 A | 2/1999 | Hoffberg et al. |
| 5,880,768 A | 3/1999 | Lemmons et al. |
| 5,903,545 A | 5/1999 | Sabourin et al. |
| 5,911,139 A | 6/1999 | Jain et al. |
| 5,956,716 A | 9/1999 | Kenner et al. |
| 5,973,683 A | 10/1999 | Cragun et al. |
| 5,977,964 A | 11/1999 | Williams et al. |
| 6,005,565 A | 12/1999 | Legall et al. |
| 6,005,597 A | 12/1999 | Barrett et al. |
| 6,008,802 A | 12/1999 | Iki et al. |
| 6,028,603 A | 2/2000 | Wang et al. |
| 6,029,195 A | 2/2000 | Herz |
| 6,049,333 A | 4/2000 | LaJoie et al. |
| 6,075,526 A | 6/2000 | Rothmuller |
| 6,075,530 A | 6/2000 | Lucas et al. |
| 6,081,750 A | 6/2000 | Hoffberg et al. |
| 6,088,722 A | 7/2000 | Herz et al. |
| 6,133,909 A | 10/2000 | Schein et al. |
| 6,163,316 A | 12/2000 | Killian |
| 6,172,674 B1 | 1/2001 | Etheredge |
| 6,177,931 B1 | 1/2001 | Alexander et al. |
| 6,181,335 B1 | 1/2001 | Hendricks et al. |
| 6,185,573 B1 | 2/2001 | Angelucci et al. |
| 6,209,103 B1 | 3/2001 | Schreiber et al. |
| 6,216,264 B1 | 4/2001 | Maze et al. |
| 6,271,840 B1 | 8/2001 | Finseth et al. |
| 6,275,829 B1 | 8/2001 | Angiulo et al. |
| 6,324,538 B1 | 11/2001 | Wesinger, Jr. et al. |
| 6,370,543 B2 | 4/2002 | Hoffert et al. |
| 6,388,714 B1 | 5/2002 | Schein et al. |
| 6,397,387 B1 | 5/2002 | Rosin et al. |
| 6,437,836 B1 | 8/2002 | Huang et al. |
| 6,449,608 B1 | 9/2002 | Morita et al. |
| 6,505,348 B1 | 1/2003 | Knowles et al. |
| 6,760,918 B2 | 7/2004 | Rodriguez et al. |
| 2001/0029610 A1 | 10/2001 | Corvin et al. |
| 2002/0174430 A1 | 11/2002 | Ellis et al. |
| 2004/0117831 A1 | 6/2004 | Ellis et al. |
| 2004/0123319 A1 | 6/2004 | Kim |
| 2004/0268250 A1 | 12/2004 | Danker et al. |
| 2005/0235319 A1 | 10/2005 | Carpenter et al. |
| 2005/0278741 A1 | 12/2005 | Robarts et al. |
| 2005/0283473 A1* | 12/2005 | Rousso et al. ............... 707/5 |
| 2006/0101503 A1* | 5/2006 | Venkataraman et al. ..... 725/136 |
| 2007/0214126 A1 | 9/2007 | Kikinis |
| 2007/0253678 A1 | 11/2007 | Sarukkai |
| 2008/0177706 A1 | 7/2008 | Yuen |
| 2008/0244431 A1* | 10/2008 | Chea et al. ............... 715/764 |
| 2009/0019485 A1* | 1/2009 | Ellis et al. ............... 725/40 |
| 2010/0082450 A1 | 4/2010 | Greaves et al. |

FOREIGN PATENT DOCUMENTS

| | | |
|---|---|---|
| EP | 0525427 | 2/1993 |
| EP | 0721253 | 7/1996 |
| EP | 0774866 | 5/1997 |
| EP | 0854645 | 7/1998 |
| GB | 1 554 411 | 10/1979 |
| JP | 09-138804 | 5/1997 |
| WO | WO-86/01359 | 2/1986 |
| WO | WO-89 03085 | 4/1989 |
| WO | WO-9413107 | 6/1994 |
| WO | WO-9414284 | 6/1994 |
| WO | WO-9526608 | 10/1995 |
| WO | WO-9528799 | 10/1995 |
| WO | WO-9617473 | 6/1996 |
| WO | WO-9641478 | 12/1996 |
| WO | WO-9748230 | 12/1997 |
| WO | WO-9749242 | 12/1997 |
| WO | WO-9826584 | 6/1998 |
| WO | WO-9843183 | 10/1998 |
| WO | WO-9848566 | 10/1998 |
| WO | WO-9901984 | 1/1999 |
| WO | WO-9914947 | 3/1999 |
| WO | WO-9945701 | 9/1999 |
| WO | WO-0004708 | 1/2000 |
| WO | WO-0005889 | 2/2000 |
| WO | WO-0028734 | 5/2000 |

OTHER PUBLICATIONS

"Directv Plus[2] System", Thompson Consumer Electronics, Inc. (1999).

"TV Guide movie database" Internet web pages printed on Aug. 12, 1999 (9 pages).

"Visually Searching the Web for Content"; John R. Smith and Shih-Fu Chang; Columbia University; IEEE; Jul.-Sep. 1997.

Brugliera, Vito, "Digital On-Screen Display: A New Technology for the Consumer Interface" (Jun. 1993).

Harmandas V. et al., Association for Computing Machinery: "Image Retrieval by Hypertext Links" Proceedings of the 20th Annual International ACM-SIGIR Conference on Research and Development in Information Retrieval. Philadelphia, PA, Jul. 27-31, 1997, Annual International ACM-SIGIR Conference on Research and Development in Information Retrieve, Jul. 27, 1997, pp. 296-303, XP000782013 ISBN: 0-89791-836-3 *abstract* *p. 297, right-hand column, line 15-line 40* *p. 298, left-hand column, line 4-line 26*.
International Business Machines Corporation: "Use of close captioning for indexing and retrieval of video" Research Disclosure, Mason Publications, Hampshire, GB, vol. 413, No. 125, Sep. 1998, XP007123340 ISSN: 0347-4353 *the whole document*.
Smith J. R. et al., Society of Photo-Optical Instrumentation Engineers (SPIE): "An Image and Video Search Engine for the World-Wide Web" Storage and Retrieval for Image and Video Databases 5. San Jose, Feb. 13-14, 1997, Proceedings of SPIE, Bellingham, SPIE, US, vol. 3022, Feb. 13, 1997 (Feb. 12, 1997), pp. 84-95, XP000742373 ISBN: 0-81894-2433-1, *paragraph 02.1!; figure 2*.

* cited by examiner

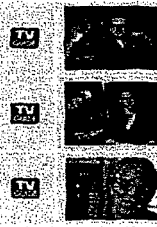
FIG. 10

SYSTEMS AND METHODS FOR PROVIDING ADVANCED INFORMATION SEARCHING IN AN INTERACTIVE MEDIA GUIDANCE APPLICATION

OBJECT OF THE INVENTION

This invention relates to interactive media guidance applications, and more particularly, improved functionalities for searching media information in a guidance application.

The amount of media information available to users in any given media guidance application may be substantial. Commonly available media information includes media program listings, media programming information, information on media personalities, and related media information such as video clips, photographs, articles, etc. In view of the large amount of media information available to users, much of which may not be media program listing information, many users desire a form of media guidance that enables efficient and intuitive searching of all categories of media information (e.g., to obtain media program listings and other related media information) and that returns personalized search results of a useful quantity.

Therefore, it would be desirable to extend the search functionality to media information other than media program listings.

It would also be desirable to enable users of the guidance application to characterize the media information for more efficient searching.

It would also be desirable to provide an improved search algorithm for broadly defined search expressions.

It would also be desirable to provide an improved search functionality that enables multiple search contexts.

Therefore, it would be desirable to provide an improved search feature in an interactive media guidance application.

SUMMARY OF THE INVENTION

These and other objects of the invention are accomplished in accordance with the principles of the present invention by providing an interactive media guidance application that provides improved search functionality for media information.

The search feature of the present guidance application is provided in view of the appreciable amount of media information that is not necessarily media program listing information and provides the user with an improved system and method for searching the entire media information domain. The present guidance application enables searching of the entire spectrum of media information and returns search results that represent a vertical slice through different types of media information. For example, the guidance application may enable searching through media program listings, media programming information, information on celebrities, photos, videos, and audio clips, newspaper and magazine articles, etc. The media information provided through the guidance application system may be categorized to enable searching of the media information and delivery of organized search results to the user.

In one illustrative approach, the search feature of the present guidance application may be enabled by defining search objects in the media information domain. Search objects may be any identifiable entity in the media information domain. For example, search objects may be titles of media programs (e.g., titles of television shows or series and movies). Search objects may be names of celebrities, such as actors, musicians, directors, producers, and other people of note. Search objects defined in the media information domain may provide an appropriate entertainment context to the search feature implemented by the guidance application.

The search feature of the present invention may be further implemented by tagging each piece of media information provided by the system with the relevant search objects. This tagging process may be achieved using a human editor. Alternatively, a machine process may be used to scan for search objects contained within the media information. When the user enters a search expression that matches a search object, the guidance application may perform a query through the media information to find the media information that has been tagged with the search object. The search results from the query may be from any category of media information and may be displayed to the user.

In another aspect of the present invention, the interactive media guidance application enables the user to apply tags to the media information stored in the guidance application system. As previously described, search object tags may be applied to any piece of media information stored in the guidance application system to enable searching of the media information by search objects. These tags are generally defined by the guidance application provider and may not be controlled by users of the system. Therefore, this aspect of the present invention enables the users of the guidance application to create and apply tags to pieces of media information and enables the users to search for media information using these user applied tags as search objects. In one approach, user submitted tags may be collected and filtered to produce a set of core tags, which are then applied to the media information for which they were submitted. The user may then search the media information by performing searches with the user submitted tags.

In another aspect of the present invention, the guidance application may provide customized search algorithms defined around generic terms or expressions rather than providing a text based search when a user enters such generic search expressions. For example, if a particular user enters the search expression "baseball," the guidance application may provide a search algorithm to return a personalized set of baseball related media information to that user. In one suitable approach, the search algorithm used with a particular search term is determined through a combination of user metrics and editorial input.

In another aspect of the present invention, the guidance application may provide the user with a context search. Multiple search objects with different context settings may be defined and associated with the same user entered search expression. The multiple search objects may be differentiated using context modifiers. The user may enter the common search expression and the guidance application may then determine the context setting of the search initiated by the user. For example, the context setting may be explicitly set by the user or may be implicitly set by the guidance application depending on the context of the display page on which the search request is entered. Once the context setting for the search is determined, the guidance application performs a search using the search object having the appropriate context setting.

Further features of the invention, its nature and various advantages will be more apparent from the accompanying drawings and the following detailed description of the preferred embodiments.

BRIEF DESCRIPTION OF THE FIGURES

The above and other features of the present invention, its nature and various advantages will be more apparent upon consideration of the following detailed description, taken in conjunction with the accompanying drawings in which:

FIG. 5 is an illustrative display screen of program listings in accordance with one embodiment of the present invention;

FIG. 7 is an illustrative display screen of search results in accordance with one embodiment of the present invention;

FIG. 8 is an illustrative display screen of a TV listings page in accordance with one embodiment of the present invention;

FIG. 9 is an illustrative display screen of a TV show page in accordance with one embodiment of the present invention;

FIG. 10 is an illustrative display screen of a movie page in accordance with one embodiment of the present invention;

FIG. 11 is an illustrative display screen of search results for a text search in accordance with one embodiment of the present invention;

FIG. 16 is an illustrative display screen of a page for choosing between a text search, a search object-based query, and a user tag search in accordance with one embodiment of the present invention;

DETAILED DESCRIPTION OF THE PREFERRED EMBODIMENTS

The amount of media programming available to users in any given media delivery system can be substantial. Commonly available media programming include television programs, movies, music, interactive applications, etc. Moreover, there exists a large amount of information related to media programming (e.g., information on movies, television programs, celebrities) that draws substantial interest from users. As such, media programming and related information about media programs, people, and events surrounding the entertainment industry collectively define the media information domain. In view of the large amount of media information available to users, many users desire a form of media guidance that enables efficient searching of the media information domain (e.g., to obtain media program listings and related information of interest to a user). An application which provides such guidance is referred to herein as an interactive media guidance application or, sometimes, a media guidance application or a guidance application.

Interactive media guidance applications may take various forms. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices, such as handheld computers, personal digital assistants (PDAs), mobile telephones, or other mobile devices. On these devices, users are able to navigate among and locate the same media available through a television. Consequently, media guidance is necessary on these devices as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
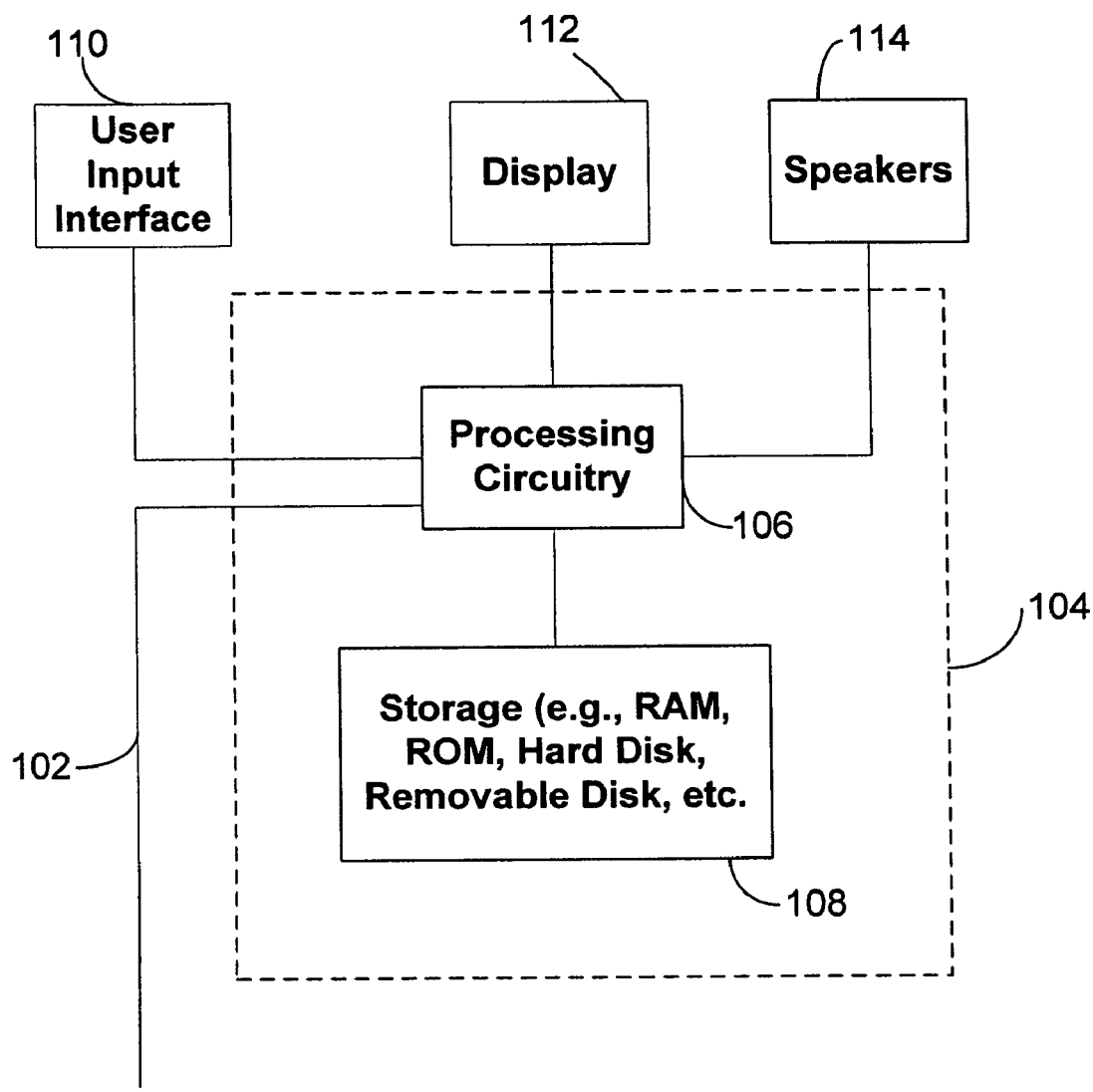
FIG. 1 is a diagram of an illustrative user equipment device in accordance with one embodiment of the present invention.

Users may access media content and the media guidance application (and its display screens described below) from one or more of their user equipment devices. FIG. 1 shows a generalized embodiment of illustrative user equipment device 100. More specific implementations of user equipment devices are discussed below in connection with FIG. 2. User equipment device 100 may receive media information via input/output (hereinafter "I/O") path 102. I/O path 102 may provide media content (e.g., broadcast programming, on-demand programming, Internet content, and other video or audio) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry 106 such as processing circuitry based on one or more microprocessors, microcontrollers, digital signal processors, programmable logic devices, etc. In some embodiments, control circuitry 104 executes instructions for a media guidance application stored in memory (i.e., storage 108). In client-server based embodiments, control circuitry 104 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 108 that is part of control circuitry 104. Storage 108 may include one or more of the above types of storage devices. For example, user equipment device 100 may include a hard drive for a DVR (sometimes called a personal video recorder, or PVR) and a DVD recorder as a secondary storage device. Storage 108 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits may also be included as part of circuitry 104. Encoding circuitry (e.g., for converting over-the-air, analog, or digital signals to MPEG signals for storage) may also be provided. Control circuitry 104 may also include scaler circuitry for upconverting and downconverting media into the preferred output format of the user equipment 100. Circuitry 104 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may control the control circuitry 104 using user input interface 110. User input interface 110 may be any suitable user interface, such as a remote control, mouse, trackball, keypad, keyboard, touch screen, touch pad, stylus input, joystick, voice recognition interface, or other user input interfaces. Display 112 may be provided as a stand-alone device or integrated with other elements of user equipment device 100. Display 112 may be one or more of a monitor, a television, a liquid crystal display (LCD) for a mobile device, or any other suitable equipment for displaying visual images. In some embodiments, display 112 may be HDTV-capable. Speakers 114 may be provided as integrated with other elements of user equipment device 100 or may be stand-alone units. The audio component of videos and other media content displayed on display 112 may be played through speakers 114. In some embodiments, the audio may be distributed to a receiver (not shown), which processes and outputs the audio via speakers 114.

Figure 2:
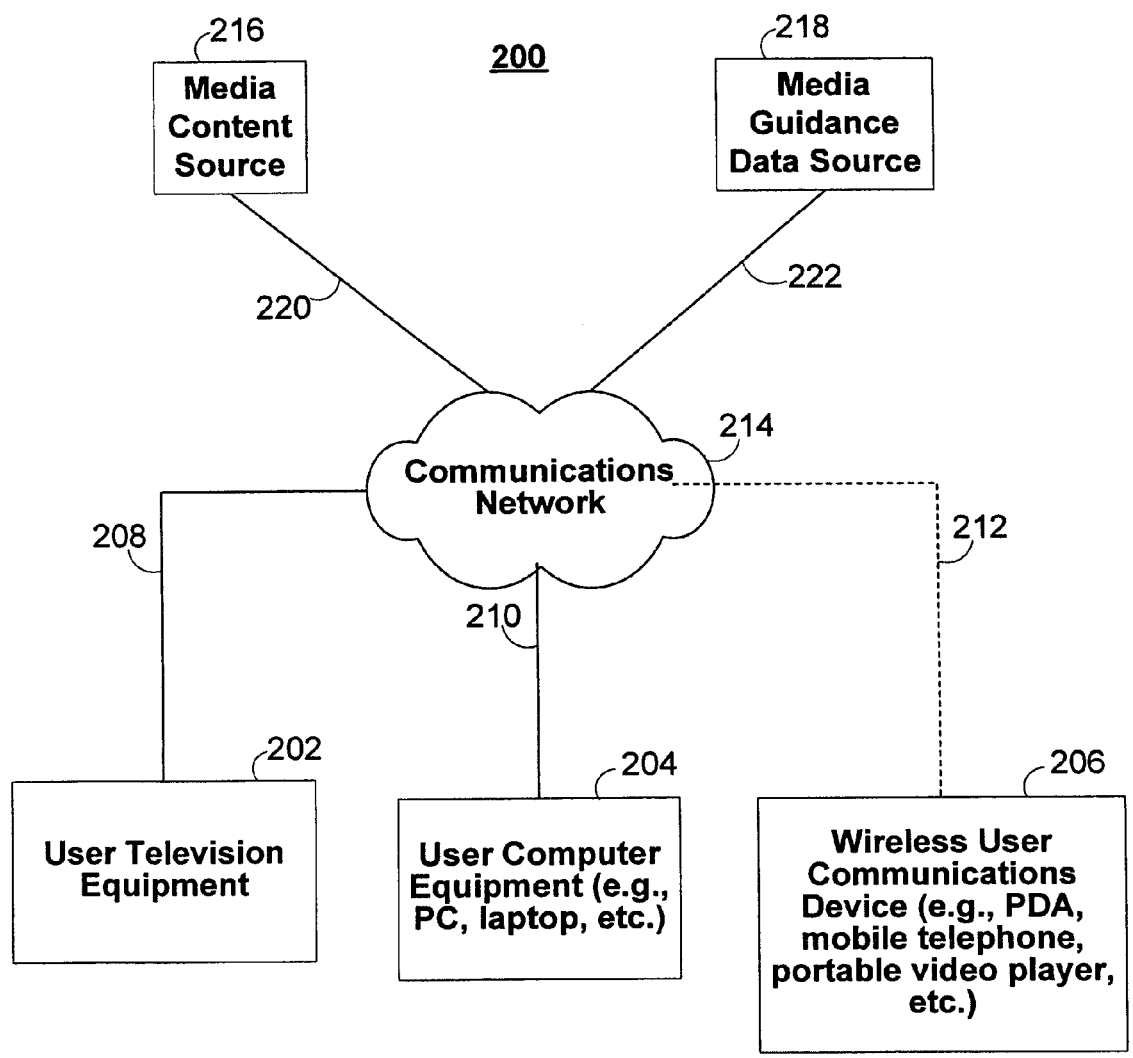
FIG. 2 is a diagram of an illustrative interactive media system in accordance with one embodiment of the present invention.

User equipment device 100 of FIG. 1 can be implemented in system 200 of FIG. 2 as user television equipment 202, user computer equipment 204, wireless user communications device 206, or any other type of user equipment suitable for accessing media information, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 202 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 204 may include a PC, a laptop, a tablet, a WebTV box, a personal computer television (PC/TV), a PC media server, a PC media center, or other user computer equipment. WEBTV is a trademark owned by Microsoft Corp. Wireless user communications device 206 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 202, user computer equipment 204, and wireless user communications device 206 may utilize at least some of the system features described above in connection with FIG. 1 and, as a result, include flexibility with respect to the type of media content available on the device. For example, user television equipment 202 may be Internet-enabled allowing for access to Internet content, while user computer equipment 204 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 200, there is typically more than one of each type of user equipment device but only one of each is shown in FIG. 2 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 212 is drawn with dotted lines to indicate that in the exemplary embodiment shown in FIG. 2 that it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 214.

System 200 includes media programming source 216 and related media data source 218 coupled to communications network 214 via communication paths 220 and 222, respectively. Paths 220 and 222 may include any of the communication paths described above in connection with paths 208, 210, and 212. Communications with the media content source 216 and media guidance data source 218 may be exchanged over one or more communications paths, but are shown as a single path in FIG. 2 to avoid overcomplicating the drawing. In addition, there may be more than one of each of media programming source 216 and related media data source 218, but only one of each is shown in FIG. 2 to avoid overcomplicating the drawing. (The different types of each of these sources are discussed below.) If desired, media programming source 216 and related media data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Media programming source 216 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media programming source 216 may be the originator of media content (e.g., a television broadcaster, a Webcast provider, etc.) or may not be the originator of media content (e.g., an on-demand media content provider, an Internet provider of video content of broadcast programs for downloading, etc.). Media programming source 216 may include cable sources, satellite providers, on-demand providers, Internet providers, or other providers of media content. Media programming source 216 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al. U.S. Patent Application Publication No. 2005/0229213, which is hereby incorporated by reference herein in its entirety.

Related media data source 218 may provide media listings information (e.g., broadcast times, broadcast channels, media titles, media descriptions, ratings information (e.g., parental control ratings, critic's ratings, etc.), genre or category information, actor information, logo data for broadcasters' or providers' logos, etc.), media information (e.g., actor profiles, video clips related to media programs, magazine articles related to media celebrities), media format (e.g., standard definition, high definition, etc.), advertisement information (e.g., text, images, media clips, etc.), on-demand information, and any other type of media related data.

Media guidance application data may be provided to the user equipment devices using any suitable approach. In some embodiments, the guidance application may be implemented through use of the Internet. In other embodiments, the guidance application may be a stand-alone interactive television program guide that receives program guide data via a data feed (e.g., a continuous feed, trickle feed, or data in the vertical blanking interval of a channel).

Program schedule data and other media information data may be provided to the user equipment on a television channel sideband, in the vertical blanking interval of a television channel, using an in-band digital signal, using an out-of-band digital signal, or by any other suitable data transmission technique. Program schedule data and other media information data may be provided to user equipment on multiple analog or digital television channels. Program schedule data and other media information data may be provided to the user equipment with any suitable frequency (e.g., continuously, daily, a user-specified period of time, a system-specified period of time, in response to a request from user equipment, etc.). In some approaches, data from related media data source 218 may be provided to users' equipment using a client-server approach. For example, a guidance application client residing on the user's equipment may initiate sessions with source 218 to obtain data when needed. Related media data source 218 may provide user equipment devices 202, 204, and 206 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 104 of user equipment device 100 and partially on a remote server as a server application (e.g., related media data source 218). The guidance application displays may be generated by the related media data source 218 and transmitted to the user equipment devices. The related media data source 218 may also transmit data for storage on the user equipment, which then generates the guidance application displays based on instructions processed by control circuitry.

Media guidance system 200 is intended to illustrate a number of approaches, or network configurations, by which user equipment devices and sources of media content and other media information may communicate with each other for the purpose of accessing media and providing media information. The present invention may be applied in any one or a subset of these approaches, or in a system employing other approaches for delivering media programming and providing media guidance. The following three approaches provide specific illustrations of the generalized example of FIG. 2.

In one approach, user equipment devices may communicate with each other within a home network. User equipment devices can communicate with each other directly via short-range point-to-point communication schemes describe above, via indirect paths through a hub or other similar device provided on a home network, or via communications network 214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al. U.S. Patent Application Publication No. 2005/0251827, which is hereby incorporated by reference herein in its entirety. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al. U.S. Patent Application Publication No. 2005/0028208, which is hereby incorporated by reference herein in its entirety.

In a third approach, users of user equipment devices inside and outside a home can use their media guidance application to communicate directly with media content source 216 to access media content. Specifically, within a home, users of user television equipment 202 and user computer equipment 204 may access the media guidance application to navigate among and locate desirable media content. Users may also access the media guidance application outside of the home using wireless user communications devices 206 to navigate among and locate desirable media content.

Figure 3:
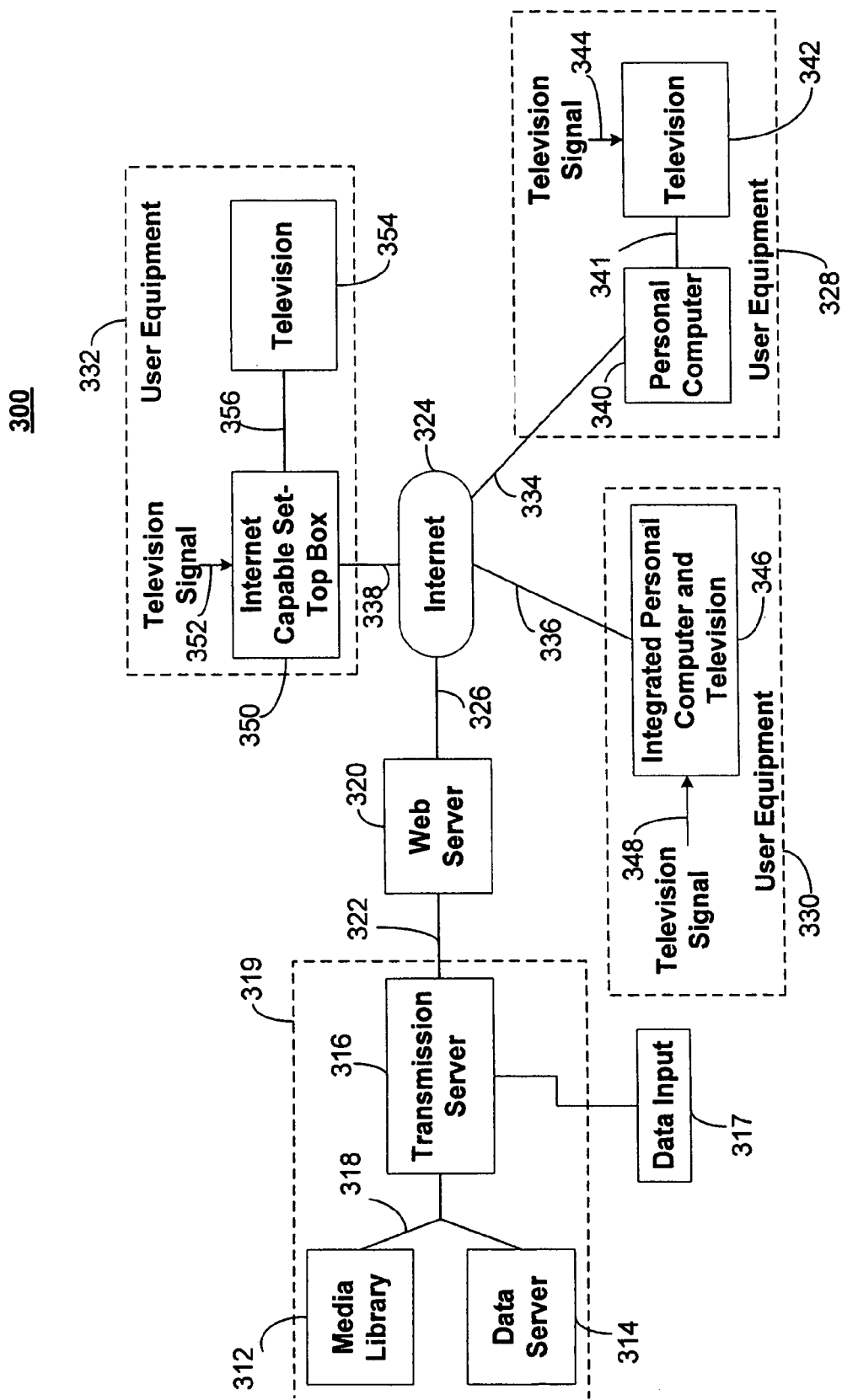
FIG. 3 is a diagram of an illustrative interactive media system implemented using the Internet in accordance with one embodiment of the present invention.

FIG. 3 illustrates one particular approach in which an interactive media guidance application system 300 is implemented through use of the Internet. Media information is stored in media library 312 and data server 314. Media library 312 may include suitable electronic memory or disc media for storing multimedia content. Media library 312 may include audio and video clips, such as previews of media programs or interviews with celebrities. The media information stored in media library 312 may be primarily in multi-media format (e.g., audio and video format). Data server 314 may include various databases of media information. For example, data server 314 may include a database containing descriptions of videos stored in media library 312. Data server 314 may also include a database containing information on media program listings, a pay per view database containing information regarding pay-per-view events, and a scheduling information database that includes broadcast times of time-dependent media programming. Data server 314 may include a cable system operator database containing channel lineups of different cable operators, information on the time zone of the operator, weather data for the operator's region, data on the zip codes in the cable system operator's area, etc. Other databases may be supported by data server 314, as desired. The media information in data server 314 may be primarily text based data.

Media library 312 and data server 314 are interconnected with transmission server 316 via internal network 318. Media library 312, data server 314, network 318, and transmission server 316 make up computer system 319. Media program listing information may be stored on data server 314 in a relational database format and may be stored on transmission server 316 in an object-oriented database format. For example, a building process implemented in the C++ programming language may be used to periodically (e.g., once a day) build a temporary data set of media program listing information (e.g., a seven-day to one-month data set) for storage on transmission server 316. Transmission server 316 may also receive other information for the Internet media guidance application such as weather data, sports scores, etc., via data input 317.

Media information and related data may be transferred from transmission server 316 to web server 320 via communications line 322. Communications line 322 may be part of an internal network or may be a standard dedicated communications line. Web server 320 can be connected to the Internet 324 via communications link 326. Communications link 326 may be any suitable Internet communications path.

If transmission server 316 and web server 320 are separate devices, as shown in FIG. 3, transmission server 316 can be used as a common data processing facility for other applications available from web server 320 which use the type of media information stored on transmission server 316. If desired, the functions of transmission server 316 and web server 320 can be integrated in a single machine.

Web server 320 may use standard protocols such as the TCP/IP (Transmission Control Protocol/Internet Protocol) and hypertext transfer protocol to make the media information available over the Internet 324 to users at user equipment 328, 330, and 332 via communications links 334, 336, and 338. Communications links 334, 336, and 338 are Internet links formed from telephone lines, radio-frequency (RF) links, cable modem links, satellite dish links, combinations of links such as these, or any other suitable Internet connection paths.

Multimedia system 328 has personal computer 340 and may have television 342. Certain media guidance application features may require that personal computer 340 be able to control television 342 via link 341, which may be, e.g., an infrared communications link. Link 341 allows personal computer 340 to tune television 342 using control signals. Television 342 receives television signals from input 344. The television signals received by input 344 and the other television signal inputs shown in FIG. 3 may be provided by cable television, satellite television, broadcast television, a combination of such sources, or any other suitable source of television programming signals. Internet access for multimedia system 328 is provided via Internet communications link 334.

Multimedia system 330 has an integrated personal computer and television 346. Television signals are provided at input 348. Internet access is provided via Internet communications link 336.

Multimedia system 332 has an Internet capable set-top box 350. Set-top box 350 receives television signals via input 352. Internet access is provided via Internet communications link 338. Video display signals containing television and Internet information are provided to television 354 by line 356.

During operation of system 300, certain data processing functions, such as user-initiated searches, are typically performed on web server 320. If desired, such functions can be performed on a suitable data processing component in user equipment 328, 330, and 332.

The system hardware shown in FIG. 3 for providing an Internet-based media guidance application is illustrative and other suitable hardware arrangements may be used, if desired.

Figure 4:
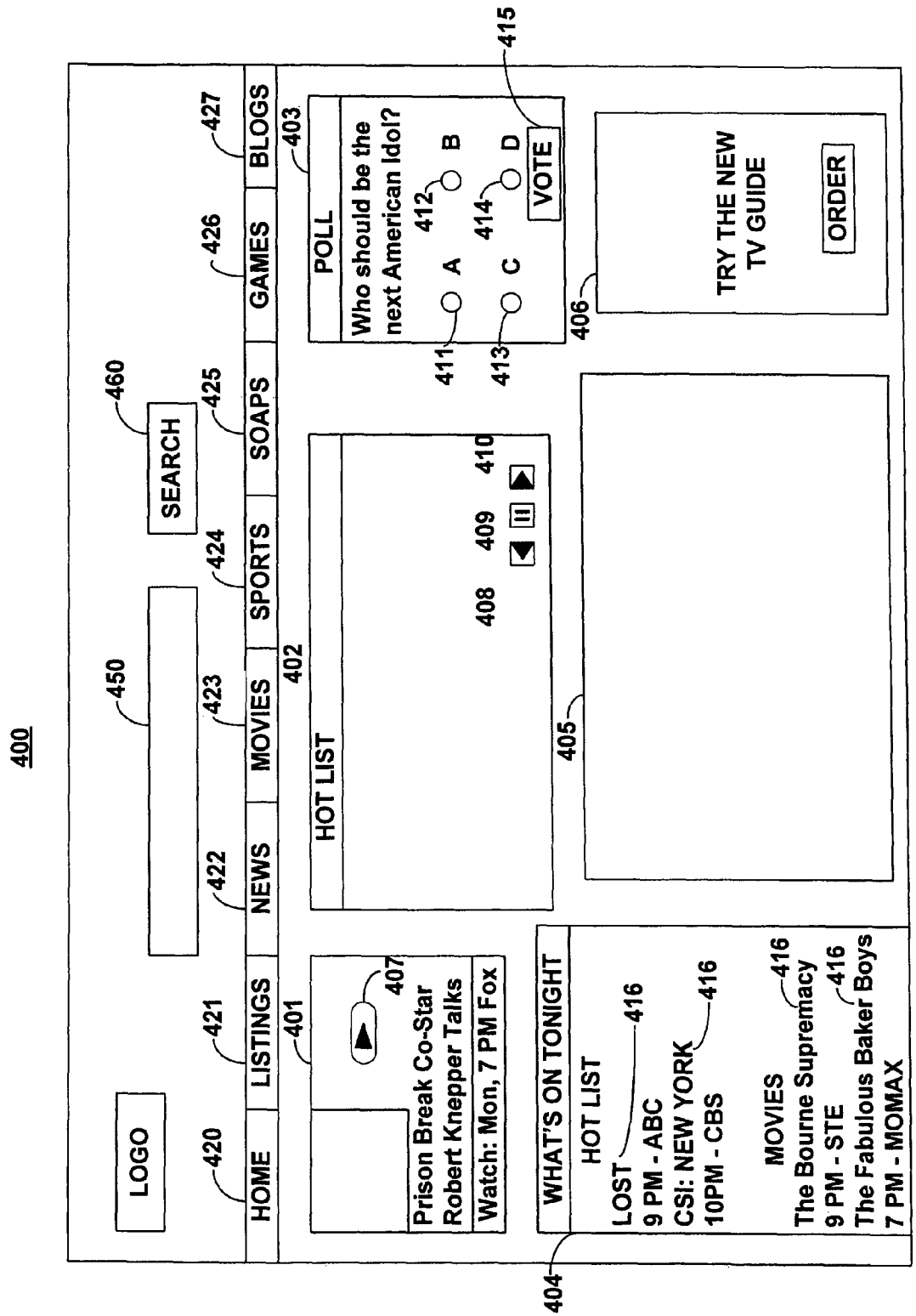
FIG. 4 is an illustrative display screen of an interactive media guidance application in accordance with one embodiment of the present invention.

FIG. 4 is an illustrative display screen 400 of the interactive media guidance application, which may be the first screen displayed to users upon initiating the guidance application. In the context of a guidance application provided through the Internet, display screen 400 may be understood as the "home page" of the guidance application.

Screen 400 may include a plurality of information regions 401/402/403/404/405/406 that provide promotional information related to media programs and advertisement information. The information regions may be interactive and may be activated by the user (e.g., by clicking on selectable links or icons displayed within the information regions) to access further information displays or multimedia clips. For example, information region 401 may promote an interview with an actor appearing in a television series and may provide a link 407 to a video clip of the interview. User activation of link 407 may cause the guidance application to display the video clip in any suitable manner (e.g., within information region 401, in another information region, in a separate pop-up window). Information region 401 may also provide information on when the user may watch the promoted television series, for example, by providing time and channel information for the television series. Information region 402 may provide scrolling pages of promotional information on a series of media programs being highlighted by the guidance application. The user may use buttons 408/409/410 to respectively rewind, pause, or fast-forward the promotional information page being displayed.

Information region 403 may provide a user poll which may query users about their opinions on certain media programming related topics. The user may select his answer using one of the provided selection buttons 411/412/413/414 and submit the answer using button 415. Upon user submission of an answer, a result screen may be displayed (e.g., within information region 403 or as a separate pop-up window) showing the cumulative results of the poll. Information region 404 may provide selected media program listings 416. Media program listings may be, but are not limited to, television program listings that provide time and channel information for television programs. Media program listings 416 may be interactive and may be activated by the user to receive further program information, such as a program description, which may be displayed in any suitable manner (e.g., within region 404, in another information region, or in a separate display page).

Information region 406 may display advertisement information for a product or service being promoted by the guidance application. Region 406 may provide an advertisement for media content that, depending on a viewer's access rights (e.g., for subscription programming), is currently available for viewing, will be available for viewing in the future, or may never become available for viewing, and may correspond to or be unrelated to one or more of the media program listings in region 404. Region 406 may be selectable and may provide further information about media content, provide information about a product or a service, enable purchasing of media content, a product, or a service, provide media content relating to the advertisement, etc. Advertisement information displayed in region 406 may be targeted based on a user's profile/preferences, monitored user activity, the type of display provided, or on other suitable targeted advertisement bases.

While advertisement region 406 is shown as rectangular shaped, advertisements may be provided in any suitable size, shape, and location in a guidance application display. Advertisement information may also include text, images, rotating images, video clips, or other types of media content. Advertisement information may be stored in the user equipment with the guidance application, in a database connected to the user equipment (e.g., database 218 of FIG. 2), in a remote location (including streaming media servers), or on other storage means or a combination of these locations. Providing advertisements in a media guidance application is discussed in greater detail in, for example, Knudson et al. U.S. Patent Application Publication No. 2003/0110499, Ward et al. U.S. Pat. No. 6,756,997, and Schein et al. U.S. Pat. No. 6,388,714, which are hereby incorporated by reference herein in their entireties. It will be appreciated that advertisements may be included in other media guidance application display screens of the present invention.

Information region 405 may be a video display region that enables the user to view and/or preview programs that are currently available, will be available, or were available to the user. The content of video region 405 may correspond to, or be independent from, one of the listings displayed in region 404. Guidance application displays including a video region are sometimes referred to as picture-in-guide (PIG) displays. PIG displays and their functionalities are described in greater detail in Satterfield et al. U.S. Pat. No. 6,564,378 and Yuen et al. U.S. Pat. No. 6,239,794, which are hereby incorporated by reference herein in their entireties. PIG displays may be included in other media guidance application display screens of the present invention. Alternatively, information region 405 may be used to display any of the promotional or advertisement information described above.

Screen 400 may include a plurality of user selectable links 420-427 that provide access to various features of the guidance application. In the Internet context, links 420-427 may be understood as links to other web pages of the guidance application that provide access to the individual features of the guidance application. As shown in FIG. 4, link 421 may provide access to one feature of the guidance application which provides the user with a full listing of media programming. Although media programming in the traditional context has generally been limited to television programs, it should be understood that the guidance application may provide listings for any suitable media programming, including and not limited to television programs, movies, music programming, on-demand programming, pay-per-view programming, interactive applications (e.g., gaming or shopping applications), Internet content, etc.

Figure 5:
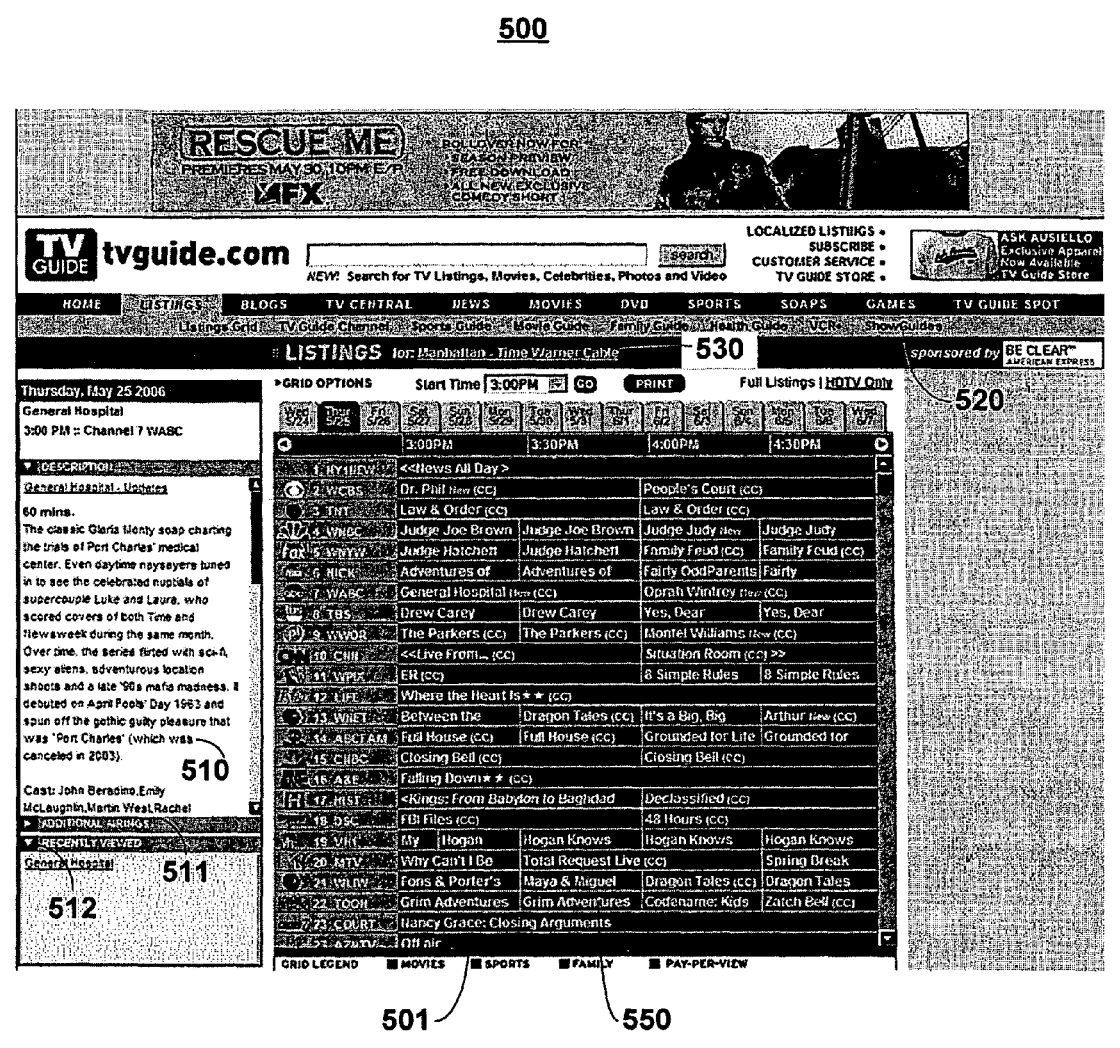

FIG. 5 shows illustrative display screen 500 of the guidance application, which may be displayed to the user upon user selection of listings link 421 in screen 400. Screen 500 may include grid guide 550, which arranges media program listings 501 by television channel and broadcast time. It should be understood, however, that media program listings may be arranged in any suitable format, and that media listings may also be provided on screen 500 that do not have a broadcast time or broadcast television channel (e.g., on-demand media program listings, listings of interactive gaming applications). Listings 501 may be selectable by the user to access further information on the selected media program. As shown in FIG. 5, a program information region 510 may be displayed adjacent the listings area 550 and may include detailed information on the user selected media program listing. For example, program information region 510 may include a description of the media program, a list of people related to the media program (e.g., actors, directors, writers), title information, and, if applicable, broadcast date, time, and channel information. Region 510 may also provide information on additional airings of a broadcast media program in area 511. A running list of the media program listings selected by the user in grid 550 may be displayed in area 512.

It should be understood that the media listings feature of the present guidance application may provide all the advantages of known media guidance applications, such as electronic television program guides. As such, the media listings feature of the present guidance application may include sub-category guides for media listings that fall under a common organizational theme (e.g., pay-per-view guide, movie guide or sports guide). As shown in FIG. 5, such sub-category guides may be provided under links 520. The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. Additional personalized media guidance application features are described in greater detail in Ellis et al. U.S. Patent Application Publication No. 2005/0251827, Boyer et al. Patent Cooperation Treaty Publication No. WO 00/28733, Forrer et al. Patent Cooperation Treaty Publication No. WO 00/79798, and Ellis et al. U.S. Patent Application Publication No. 2002/0174430, which are hereby incorporated by reference herein in their entireties.

As shown in FIG. 5, link 530 may enable the user to set or change the geographic location and/or media programming service provider for which media listings are displayed in grid 550. Link 530 may also enable the user to log in to his user profile or otherwise access the personalization settings of the guidance application.

Upon user selection of a displayed listing 501, the guidance application may enable current or future access of the media program represented by the selected listing. For example, the guidance application may cause the user equipment (e.g., equipment 202/204/206 of FIG. 2) to immediately access a media program (e.g., tune to a currently broadcast television program, initiate an interactive gaming application, begin playback of a music file). The guidance application may also enable the user to set a reminder for a future broadcast media program or set a recording for a media program or series of media programs. In some instances, the guidance application may be implemented on user equipment remote from the user equipment on which access to the media programming or recording of the media programming occurs. Such remote access and control of user equipment is fully contemplated by the present guidance application. Further details on remote access may be found in Ellis et al. U.S. Application Publication No. 2005/0028208, which is hereby incorporated by reference herein in its entirety.

Referring again to FIG. 4, user selectable links 422-427 of screen 400 may provide the user with access to other features of the guidance application. For example, "News" link 422 may, for example, provide access to various articles and columns about media programming and the entertainment industry. Similarly, "Movies," "Sports," and "Soaps" links 423-425 may provide media information related to media programs in those genres, such as a new release movie guide, information on upcoming sports programming, and daily plot synopsis of soap opera episodes. "Games" link 426 may provide the user with access to interactive gaming applications. "Blogs" link 427 may provide the user with access to web logs about, for example, media programs or celebrities created and updated by editors of the guidance application or by users.

The search feature of the present guidance application may be provided through text entry box 450 and search button 460. Previous guidance applications have provided search capabilities related to program listings. One such guidance application is described in Boyer et al. U.S. Patent Application Publication No. 2004/0128686, which is hereby incorporated by reference in its entirety. The search feature of the present invention considers the appreciable amount of media information that is not necessarily media program listing information and provides the user with an improved system and method for searching the entire media information domain. The present guidance application enables searching of the entire spectrum of media information and returns search results that represent a vertical slice through different types of media information. For example, the guidance application may enable searching through media program listings, media programming information, information on celebrities, photos, videos, and audio clips, newspaper and magazine articles, etc. In particular, although the guidance application provides a core functionality which searches through media program listings, the guidance application also concurrently provides and enables searching of information that is not related to a media program listing (e.g., information on a television series that is no longer broadcast or otherwise available for viewing).

As previously discussed, the media information provided through the guidance application system may be categorized to enable searching of the media information and delivery of organized search results to the user. In one illustrative approach, the media information may be put into the categories of media program listings, media programming information, media personalities ("celebrity") information, and related media information. Media program listings may include information such as the title of a media program and a broadcast time and channel of the media program. Media program listings may also include media programming information, such as a program description or synopsis, names of media personalities associated with the media program, and any other suitable information. For example, media programming information on a movie may include a description of the movie plot, information on the cast and director, release date, ratings information, etc. Media personality information may include a biography of the media personality, which may include information on the person's profession (e.g., actor, director), media programs with which the media personality is associated, personal information (e.g., marriage status, names of children), awards received by the media personality, interesting facts about the media personality, and any other information that may be of interest to users about the media personality. Related media information may include, for example, audio or video clips, photographs, newspaper or magazine articles within the media information domain. For example, related media information may include video clips of interviews with celebrities, video clip previews of media programming, newspaper articles on the release of new media programming, magazine articles about the personal lives of celebrities, etc. It should be understood that the above-described categories of media information are in no way mutually exclusive and there may be substantial overlap between media information placed in different categories. For example, celebrity information may include media programming information in the form of titles and descriptions of media programs that a celebrity is involved with.

In one illustrative approach, the search feature of the present guidance application may be enabled by defining search objects in the media information domain. Search objects may be any identifiable entity in the media information domain. For example, search objects may be titles of media programs (e.g., titles of television shows or series and movies). Search objects may be names of celebrities, such as actors, musicians, directors, producers, and other people of note. Search objects defined in the media information domain may provide an appropriate entertainment context to the search feature implemented by the guidance application. For example, the search object "Michael Jackson" may be defined by the guidance application to represent the celebrity pop singer Michael Jackson. Other persons or entities of the same name (e.g., Michael A. Jackson and Michael J. Jackson, actors of minor frame) may not be included in the definition of the search object "Michael Jackson." Therefore, a search object based query is advantageous over a simple text search because the query filters out media information that may not be of interest to the user (e.g., biography of Michael A. Jackson) and provides search results that are highly relevant for the popular entertainment context.

Once the appropriate search objects are defined, the search feature of the present invention may be implemented by tagging each piece of media information provided by the system (e.g., data stored in media library 312 or data server 314 of FIG. 3) with the relevant search objects. For example, if a media program listing is for the television show Friends, then the "Friends" search object may be applied to the media program listing. Similarly, if a newspaper article discusses the actors John Cusack and the director Steven Spielberg, then the "John Cusack" and "Steven Spielberg" search objects may be applied to that newspaper article. If necessary, new search objects may be defined to accommodate the content of media information provided by the guidance application system. This tagging process may be achieved using a human editor. Alternatively, a machine process may be used to scan for search objects contained within the media information. For example, a text search may be performed to identify the use of search object terms in the text or related data of the media information (e.g., text of an article, metadata attached to web pages, captions attached to audio, video, or picture files). In order to ensure that the media information is properly tagged with search objects in a machine process, it may be necessary to consider the source of the media information. For example, information from a source of entertainment context information such as television program listings or articles from an entertainment oriented magazine may be processed using a computerized process to identify search objects within the media information. On the other hand, information from general context sources, such as general interest newspapers or Internet web pages, may need to be processed using a human editor to ensure that the media information is properly tagged with the appropriate search objects.

Figure 6:
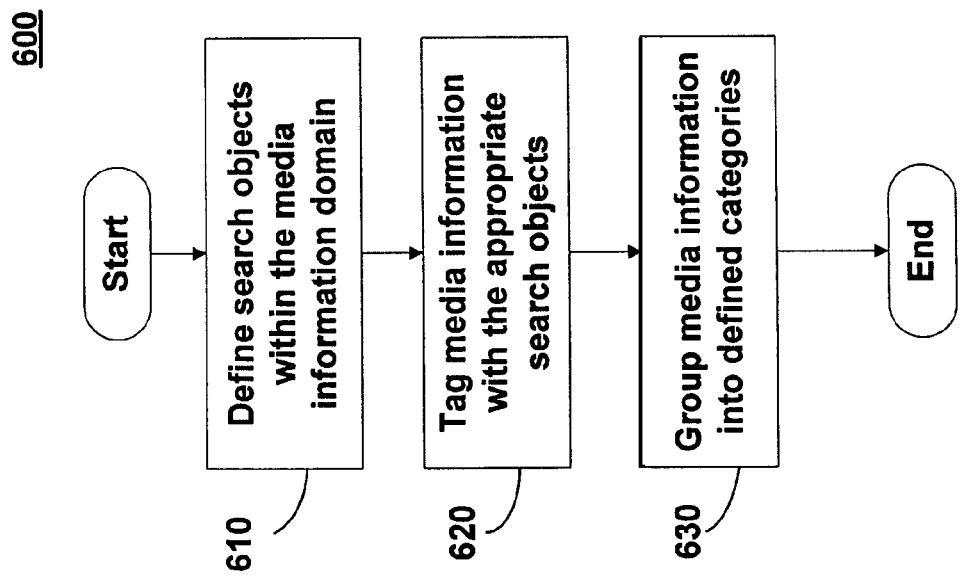
FIG. 6 is an illustrative flow chart for providing media information tagged with search objects in accordance with one embodiment of the present invention.

FIG. 6 shows an illustrative flow diagram for providing media information tagged with appropriate search objects in accordance with the present invention. At step 610, search objects within the media information domain are defined. Search objects may be, for example, names of celebrities and titles of media programs. Search objects may be created by human editors or may be collected using a computerized text scan of the media information domain. Search objects may be defined to represent a singular entity within the media information domain. For example, the famous pop singer Michael Jackson may be assigned the search object "Michael Jackson," whereas lesser known actor Michael A. Jackson may not be assigned a search object or may be assigned the search object "Michael A. Jackson." In this manner, a user query of the search object "Michael Jackson" will not return information regarding Michael A. Jackson the actor. At step 620, media information is tagged with the appropriate search objects. Each piece of media information provided by and stored in the guidance application system may be tagged to identify the search objects to which the piece of media information relates. For example, a preview clip for the movie Mission Impossible III starring Tom Cruise and directed by J. J. Abrams may be tagged with the search objects "Mission Impossible III," "Tom Cruise," and "J. J. Abrams." At step 630, media information may be grouped into defined categories to better organize the presentation of information to users. In one illustrative approach, media information may be categorized into media program listings, media programming information, celebrity information, and related media information. For example, media program listings may be listings of programs broadcast on television or otherwise accessible by the user (e.g., on-demand programs, Internet content, interactive applications). Media programming information may be detailed information on media programs. For example, media programming information for a music album may include the names of the artists, the release date, titles of the tracks, lyrics, etc. Related media information may be, for example, audio or video clips, photographs, newspaper or magazine articles within the media information domain.

The user interface for the search feature of the guidance application may be provided on any suitable display screen of the guidance application. For example, as shown in FIG. 4, the search feature may be provided as text box 450 and search button 460 at the top of display 400. The user may enter an alphanumeric expression in text box 450 with the user interface (e.g., interface input interface 110 of FIG. 1). The search expression may be processed upon user selection of search button 450. In one suitable approach, search feature interface 450/460 may be universally displayed on every display screen of the guidance application to provide the user with constant access to the search feature.

Figure 7:
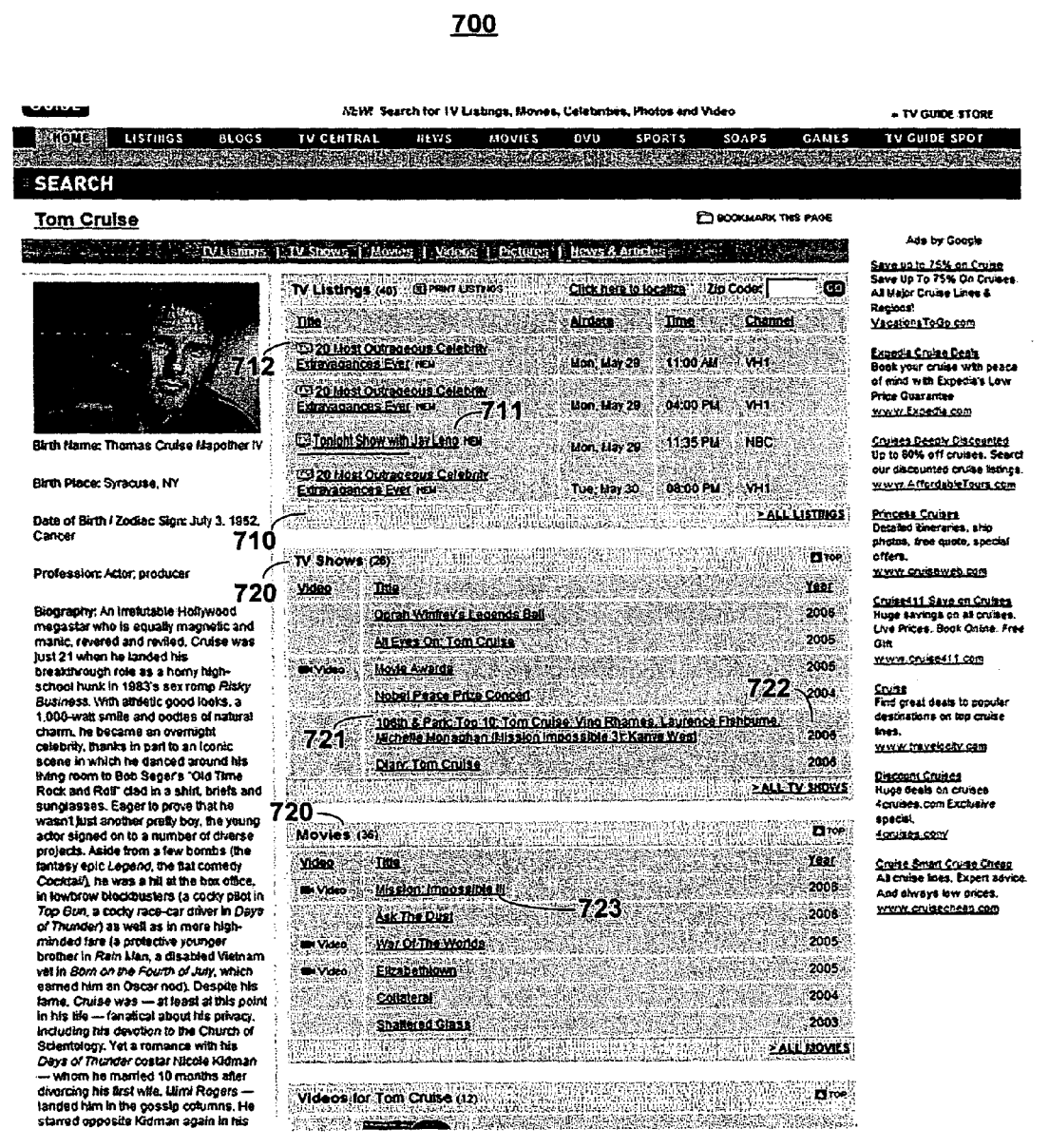

Upon user selection of search button 460, the guidance application system may query a database of search objects defined by the system (e.g., stored on web server 320 of FIG. 3) to determine if the search expression entered by the user is a defined search object. In one suitable approach, if a matching search object is found in the search object database, the guidance application system may query the databases storing the media information (e.g., library 312 and server 314 of FIG. 3) to locate all the media information that possess the matching search object. The appropriate media information may then be presented to the user on a screen and may be further grouped by category. FIG. 7 is an illustrative display screen 700 of the present guidance application showing the media information returned from a search of the defined object "Tom Cruise."

As shown in FIG. 7, a search object query for "Tom Cruise" may return media information 710 in the category of media program listings (i.e., television program listings). Media program listings 710 have been tagged with the "Tom Cruise" search object and relate to the actor Tom Cruise. For example, listing 711 for Tonight Show with Jay Leno may feature Tom Cruise as a guest on the program. It should be noted that in contrast with simple text searches, the title of listing 711 does not include the term "Tom Cruise." Instead, listing 711 has been tagged by the guidance application with the "Tom Cruise" search object because of its relevant content. Similarly, listings 710 include listings for an episode of the show "20 Most Outrageous Celebrity Extravagances Ever," which features Tom Cruise in the program. If applicable, media program listings 710 may include information on the broadcast date, time, and channel of the media program. An indicator 712 may also be displayed with each listing to indicate the source of the media program (e.g., television, on-demand, interactive applications).

Figure 8:
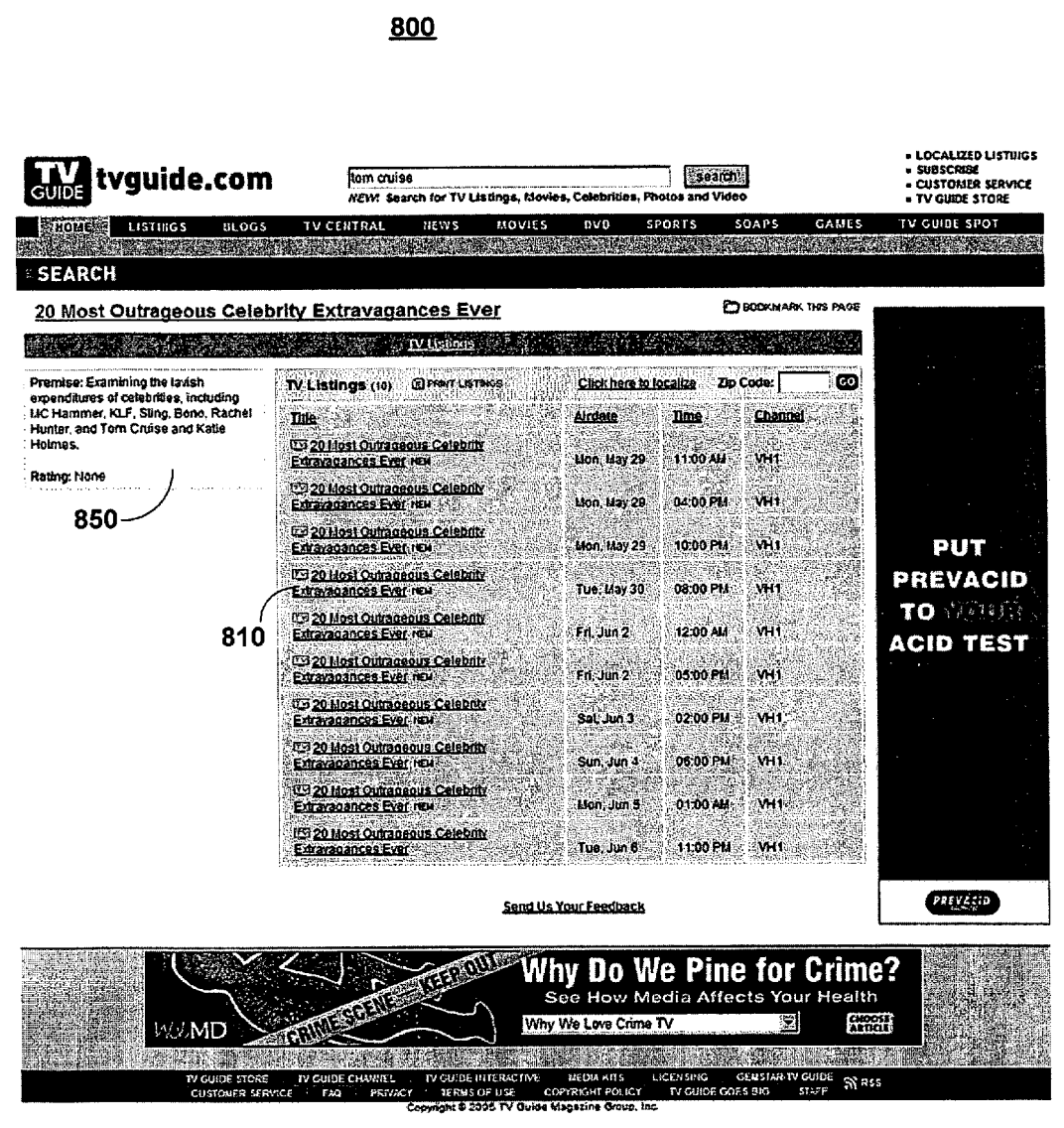

Media program listings 710 may be interactive and may be selected by the user to obtain further information on the selected listing. For example, FIG. 8 is an illustrative display screen 800 of the guidance application which may be displayed upon user selection of the listing for "20 Most Outrageous Celebrity Extravagances Ever." Screen 800 may include an information region 850 which provides further information on the selected listing, and may also include further media program listings 810 related to the selected listing. For example, further media listings 810 may be other airings of the selected media program represented by the selected listing or other episodes in the series of programs of which the selected media program is a part. It should be understood that further media listings 810 may represent the results of a further search in the media program listings category of the media information using the defined search object of the selected media program title (i.e., the search object "20 Most Outrageous Celebrity Extravagances Ever").

The search object query may also return media information 720 in the category of media programming information (e.g., television program information and movie information). Each item of media programming information may be represented by the title of a media program or series of media programs. For a media program that is in a series of media programs, the title of the particular episode may also be displayed as part of information 720. For example, media programming information 721 features the program series $106^{th}$ & Park: Top 10, and the particular episode Tom Cruise, et al. Further information on the media program may also be included within information 720, such as airing date 722 of the media program. Media programming information 720 may be interactive and may be selected by the user to obtain further media programming information on the featured media program. Media programming information 720 may also represent defined search objects of the guidance application and user selection of the information may cause the application to perform a further search through the media information using the defined search object (e.g., a television program title).

Figure 9:
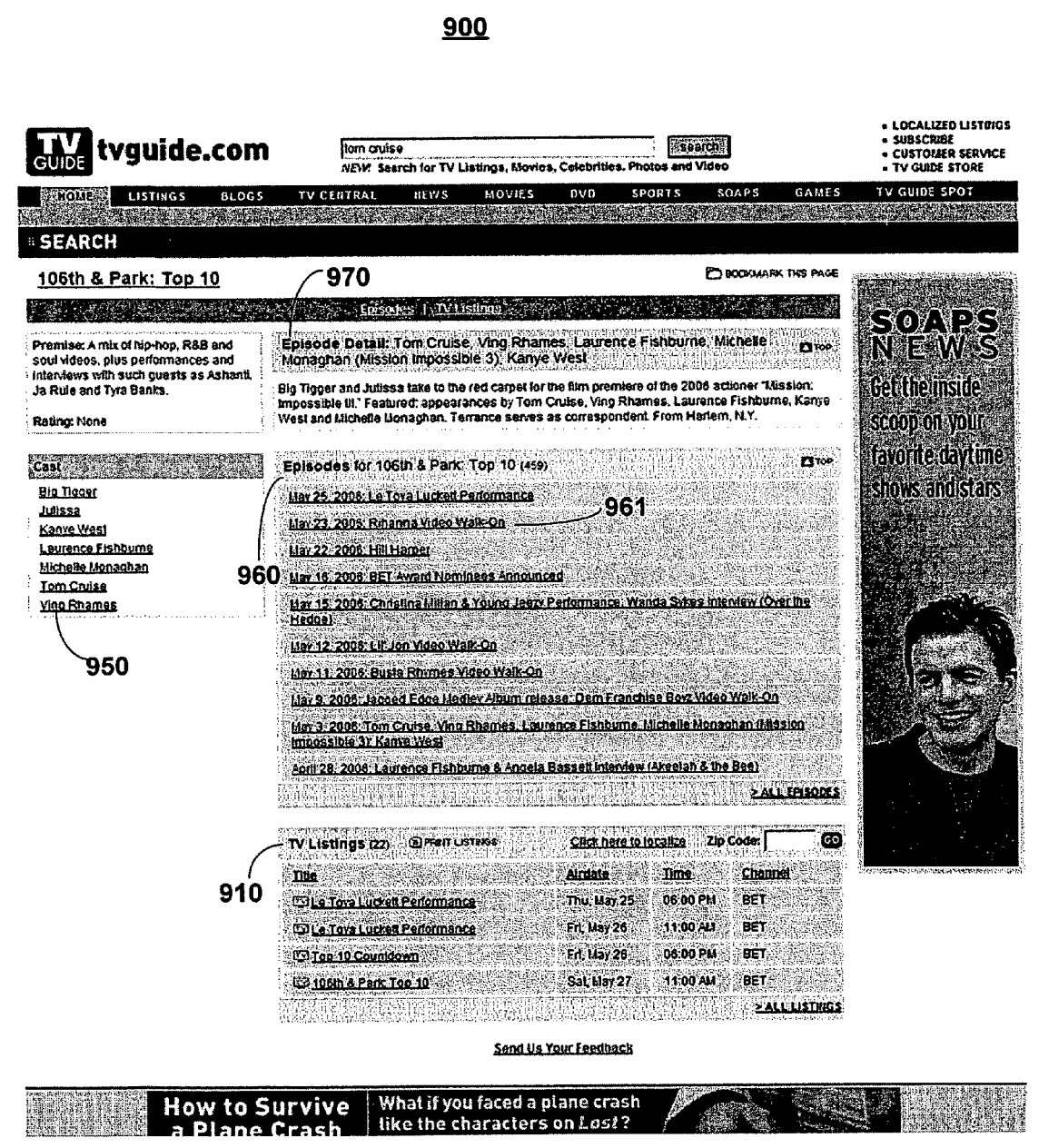

For example, FIG. 9 is an illustrative display screen 900 of the guidance application which may be displayed upon user selection of television program information 721. Screen 900 may include an information region 950 displaying information on the media program or series of media programs featured in selected information 721 (e.g., program description, cast information). For media programs that are part of a series of programs, screen 900 may also include information region 970 which provides a description of the particular episode featured in the selected information 721. Further information region 960 may provide a listing of other episodes within the selected series of media programs. Individual episode listings 961 may be further selected by the viewer to access its episode description in region 970. Screen 900 may also include media program listings information region 910 which may provide listings of other airings of the selected media program or series of media programs. Other related media information associated with the selected media program or series of media programs may also be provided and will be discussed in more detail below. It should be understood that the information displayed in regions 910/950/960/970 may represent the results of further searches through the media information using defined search objects related to the selected media program (e.g., "$106^{th}$ & Park" and "$106^{th}$ & Park: Tom Cruise").

FIG. 10 is an illustrative display screen 1000 of the guidance application which may be displayed upon user selection of movie information 723. Screen 1000 may include information region 1050 which provides a general description of the selected movie (e.g., cast information, release date, parental rating, star rating, running time, etc.). Region 1010 may be displayed to provide media program listings corresponding to the selected movie. Region 1020 may provide an editorial review of the movie. Region 1040 may display celebrity information related to the movie (or other media program), such as the names of its actors, directors, and producers. Each piece of celebrity information 1041 may also represent a defined search object in the guidance application and user selection of information 1041 may cause a further search through the media information using the defined search object (e.g., "Tom Cruise"—resulting in the search result display of FIG. 7). Information regions 1030 and 1060 may provide links to other media information related to the movie, such as photos, audio and video clips, and magazine articles. It should be understood that the information displayed in regions 1010/1020/1030/1040/1050/1060 may represent the results of further searches through the media information using defined search objects related to the selected movie (e.g., the movie title "Mission Impossible III").

Figure 11:
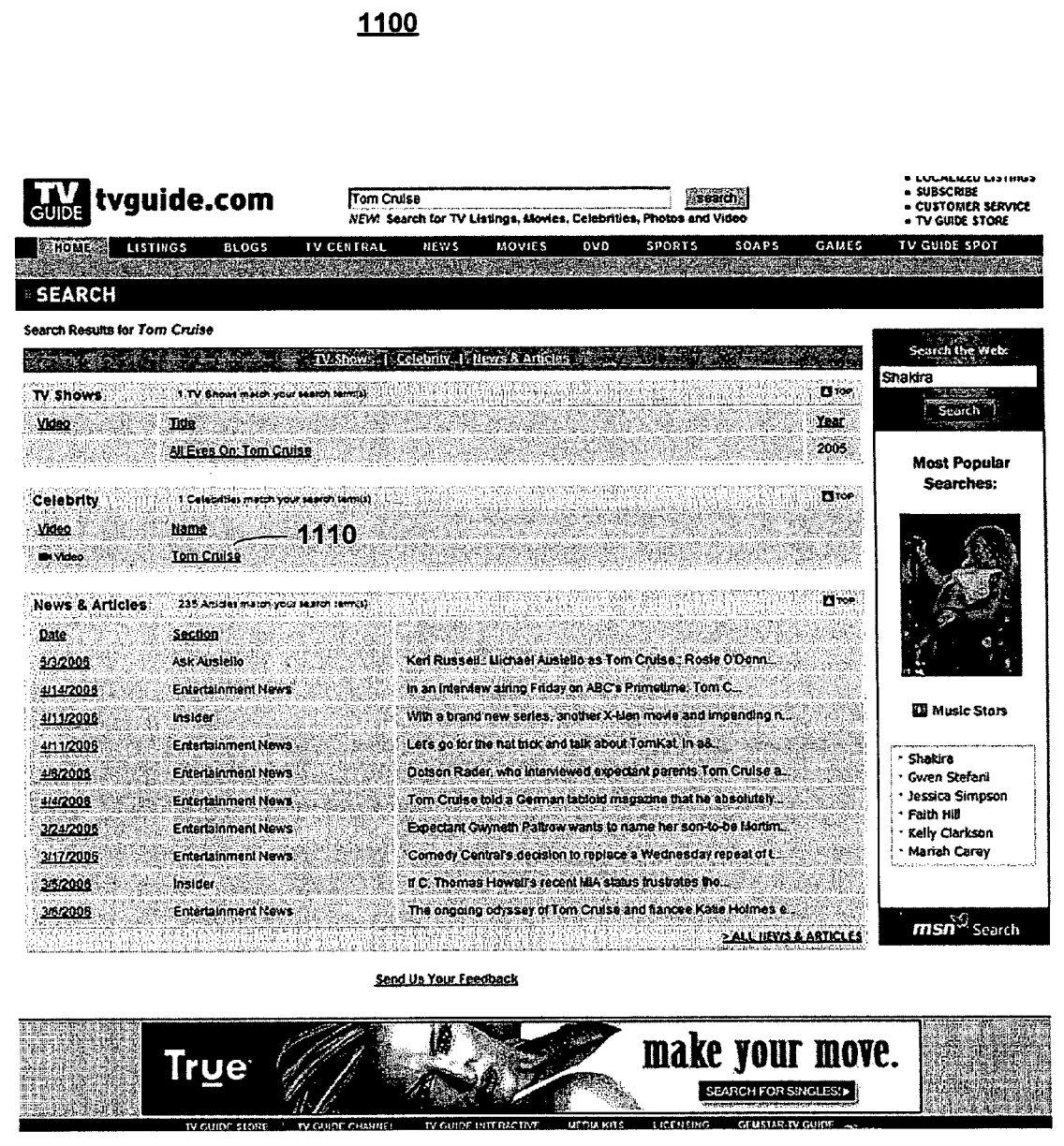

In another suitable approach, when the user enters a search expression into text box 450, the guidance application may perform a text search through the media information using the search expression and display the resulting information in a display screen. Media information in every category of information (e.g., media program listings, media programming information, celebrity information) may be searched, and the returned media information may include search objects defined by the guidance application (e.g., titles of media programs and names of celebrities). For example, as shown in FIG. 11, a text search for the term "Tom Cruise" may return a list of media information containing that term, which may include the celebrity information 1110 for Tom Cruise (as collected by the guidance application using a query for the defined search object "Tom Cruise"). User selection of information 1110 may cause the guidance application to display the search result display of FIG. 7.

In another suitable approach, when the search expression entered by the user matches a defined search object, the guidance application system may query the user as to whether the user wishes to carry out a text based search through the media information or if the user wishes to perform a search object based query through the media information. The difference being that a text search for the term "Tom Cruise" will only return media information having that term in its text, regardless of context or accuracy, where as a search object based query will return filtered media information that substantively relate to Tom Cruise, the famous actor. However, in some situations, the user may still prefer the results of a text search through the media information. Should the user elect to perform a text based search, the results page of FIG. 11 may be displayed and the user may still elect to view the search object based query results by selecting the celebrity information link 1110 for Tom Cruise. Should the user elect to perform the search object based query, then the results page of FIG. 7 may be displayed to the user. Should the search expression entered by the user not match any defined search objects, the guidance application may default to the text based search and return appropriate results.

Figure 12:
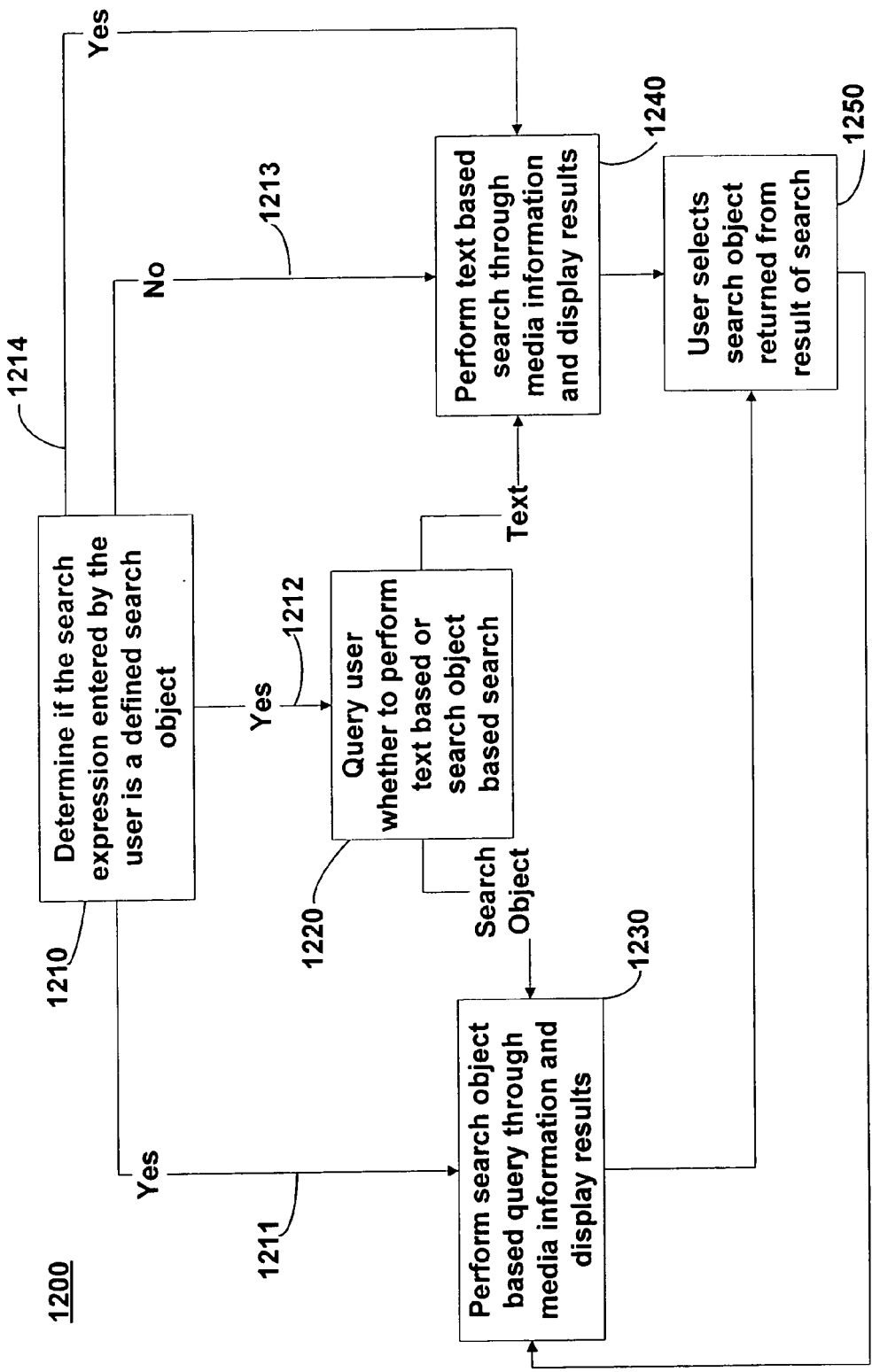
FIG. 12 is an illustrative flow chart for searching media information in accordance with one embodiment of the present invention.

FIG. 12 shows an illustrative flow diagram for searching media information in an interactive media guidance application in accordance with the present invention. At step 1210, the guidance application determines if the search expression entered by the user is a defined search object. In a first instance represented by lines 1211/1212/1214, the search expression is a defined search object. In a first approach represented by line 1211, the search object based query is performed directly at step 1230 and the results displayed to the user (e.g., in a display screen like that of FIG. 7). In a second approach represented by line 1212, the user is queried at step 1220 as to whether a text based search or a search object based query should be performed. Should the user choose the search object based query, the query is performed at step 1230 and results like that of FIG. 7 are displayed to the user based on the media information that is tagged with the search object. Should the user choose the text based search, the search is performed at step 1240 and results like that of FIG. 8 are displayed to the user based on text matching between the media information and the search expression. In a third approach represented by line 1214, a text based search is directly performed at step 1240 although the entered search expression matches a defined search object. The user may then select the matching search object returned as a result of the text search at step 1250 to perform the search object based query at 1230 and view the results. It should be understood that a text based search using any expression (not necessarily an expression matching a defined search object) may return search results that are defined search objects, and user selection of those search objects at step 1250 may also cause a search object based query at step 1230. For example, in a second instance represented by line 1213, the search expression entered by the user is determined not to be a defined search object. A text based search may be directly performed at step 1240 and, as previously discussed, the search objects returned from the text search may be selected by the user to perform further search object based queries at step 1230. It should be understood that search object based queries performed at step 1230 may also return search results that include further search objects. User selection of these returned search objects at step 1250 may result in further queries performed at step 1230.

In another aspect of the present invention, the guidance application may provide customized search algorithms defined around generic terms or expressions rather than providing the default text based search when a user enters such generic search expressions. For example, if a particular user enters the search expression "baseball," the guidance application may provide a search algorithm to return a personalized set of baseball related media information to that user instead of performing a text based search of the media information using the term "baseball." Searches based on such customized search algorithms may be referred to in the following as "atomic searches," "specialty searches," or defined "search expressions."

In one suitable approach, the search algorithm used with a particular atomic search term is determined through a combination of user metrics and editorial discretion. User metrics may be any of the profile information previously described in this application that may be used to personalize the user's guidance application. For example, user metrics may include a user's age, sex, geographic location, preference in sports teams and players, etc. User metrics may be volunteered by the user or may be collected by the guidance application or a third party, for example, by monitoring user actions (e.g., actions in the guidance application).

Figure 13:
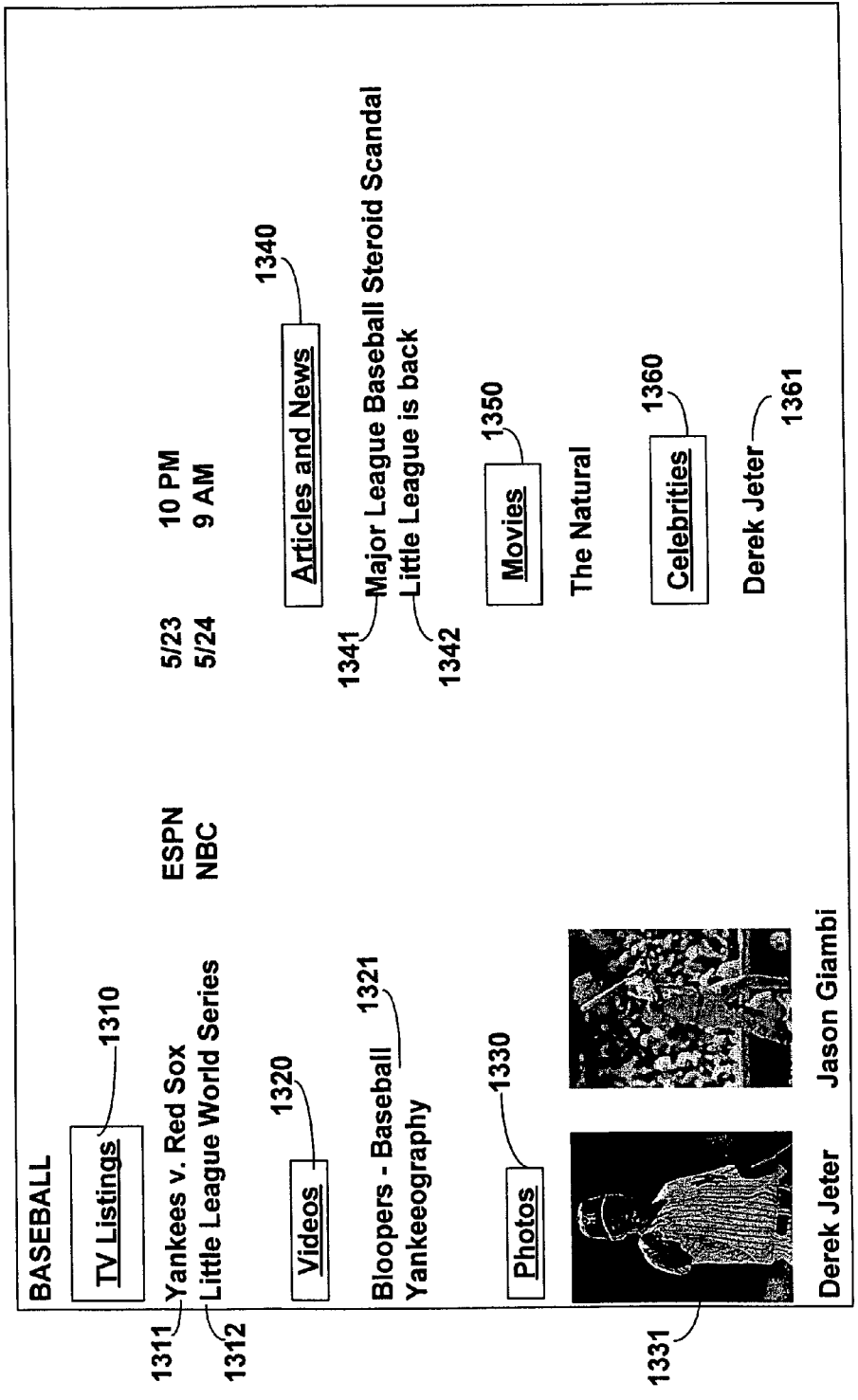
FIG. 13 is an illustrative display of search results of an atomic search in accordance with one embodiment of the present invention.

FIG. 13 shows illustrative display screen 1300 of the guidance application, which displays the personalized atomic search results of a particular user. As shown in FIG. 13, search results from a number of categories of media information is displayed. In one suitable approach, each display of media information from a particular category may be the result of an individual search performed by the guidance application. Therefore, the media information displayed in areas 1310, 1320, 1330, 1340, 1350, and 1360 may be understood as the result of multiple individual searches performed by the guidance application as part of the "baseball" atomic search algorithm. In one suitable approach, each category of media information may possess its own search under the atomic search algorithm. For example, media program listings region 1310 may be the result of a text based search for the terms "Yankees" and "little league." The search terms used to fill out region 1310 may be selected based on user metrics or editorial discretion. In this particular example, the user profile information for the user may have indicated that the user lives in New York and is a little league baseball fan, and the editor may have chosen to promote media programs featuring the Yankees. Other information regions displayed on screen 1300 may be filled out in a similar manner.

In another suitable approach, searches performed under the atomic search algorithm need not be constrained to individual categories of media information. For example, a number of searches may be defined by the guidance application to search for media information across all categories. These searches may be text based searches, search object based queries, or a combination of both. As shown in FIG. 13, a search object based query may have been included in the "baseball" atomic search algorithm for the object "Derek Jeter." For example, celebrity information 1361 may be the result of such a search, along with the newspaper article 1341 and photograph 1331 under the related media information category. Referring to the results displayed in FIG. 13, a text based search may also have been included in the algorithm for the expression "Yankees" (to yield video 1321 and media program listing 1311) and "little league" (to yield media program listing 1312 and article 1342). In one approach, the editor or the user may elect to constrain the categories of media information displayed in atomic search result screen 1300, such that media information returned from the atomic search falling outside of set categories may not be displayed to the user.

Therefore, individual searches combine to form an atomic search algorithm, whereby the type and terms of each individual search may be determined by a combination of user metrics and editorial discretion. In one approach, when the user enters a search expression for which an atomic search algorithm has been stored by the guidance application, the user may be queried as to whether an atomic search or a text search should be performed.

Figure 14:
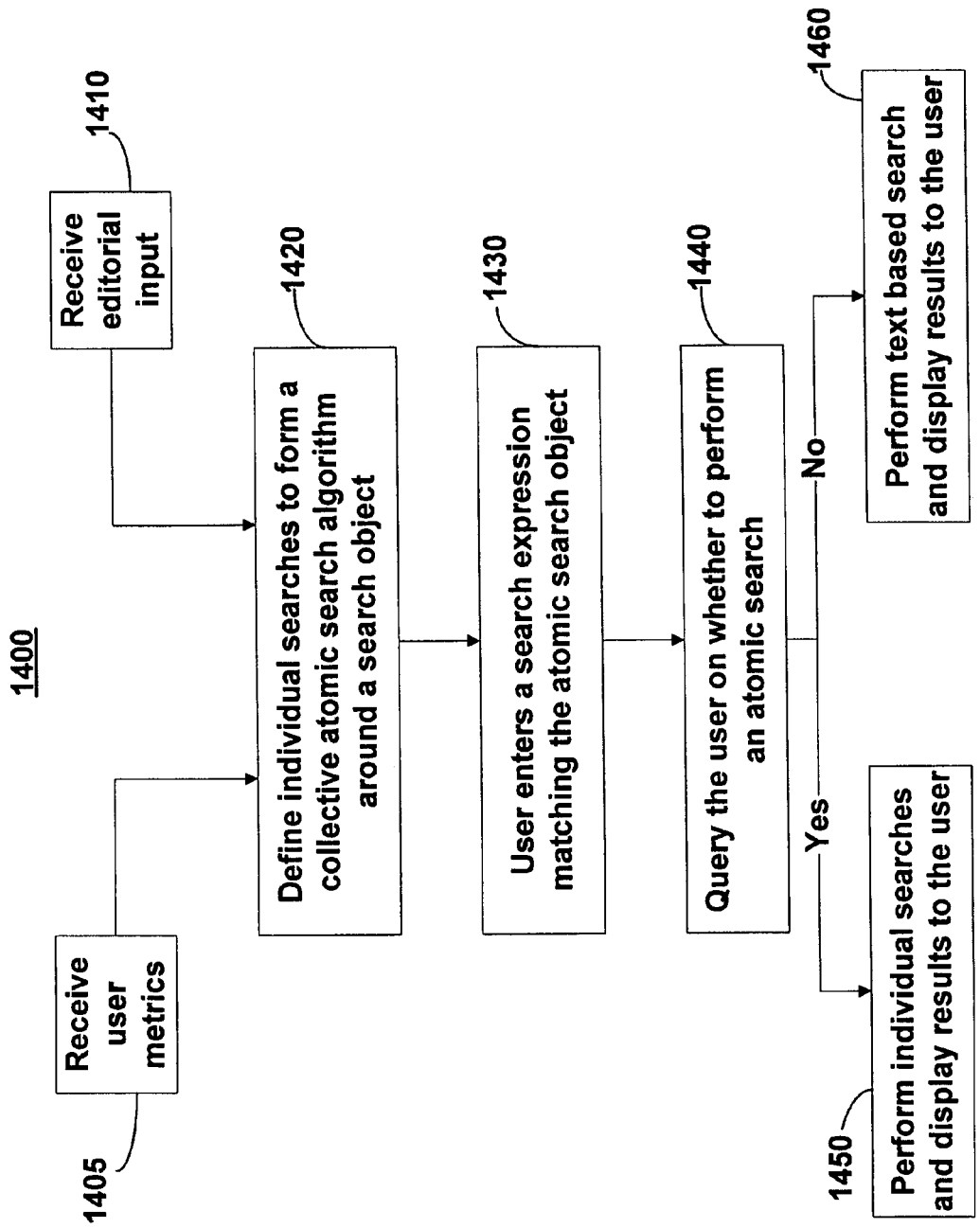
FIG. 14 is an illustrative flow chart for performing an atomic search in accordance with one embodiment of the present invention.

FIG. 14 shows an illustrative flow diagram for performing an atomic search in accordance with the present invention. At steps 1405 and 1410, user metrics and editorial input are received. At step 1420, user metrics and editorial input are used to define individual searches to form a collective atomic search algorithm around an atomic search object (e.g., "baseball"). The user enters a search expression matching the atomic search object at step 1430 (e.g., using the text entry box 450 of FIG. 4). At step 1440, the guidance application may query the user on whether to perform an atomic search on the matching atomic search object. If the user answers in the affirmative, then the individual searches of the atomic search algorithm are performed on the media information and the results are displayed to the user at step 1450 (e.g., in a screen similar to that of FIG. 13). If the user answers in the negative, then a default text based search of the media information is performed and the results displayed to the user at step 1460.

In another aspect of the present invention, the interactive media guidance application enables the user to apply tags (or search objects) to the media information stored in the guidance application system. As previously described, search object tags may be applied to any piece of media information stored in the guidance application system to enable searching of the media information by search objects. These tags are generally defined by the guidance application provider and may not be controlled by users of the system. Therefore, this aspect of the present invention enables the users of the guidance application to create and apply tags to pieces of media information and enables the users to search for media information using these user applied tags as search objects.

Figure 15:
FIG. 15 is an illustrative display screen of a page for inputting a user tag in accordance with one embodiment of the present invention.

FIG. 15 shows an illustrative display screen 1500 of the guidance application which displays a photograph of the celebrity Tom Cruise. For example, the photograph may have been accessed through information display screens like that of FIG. 7. As shown in FIG. 15, a user selectable icon 1501 may be displayed on screen 1500 that prompts the user to "Submit a Tag," Text box 1510 may also be displayed to enable the user to enter a term with which the user wishes to tag the piece of media information. The tag may be submitted by the user by selection of icon 1501. A tag may be any phrase that the user wishes to apply to the piece of media information. For example, the user may submit a tag for the photograph of Tom Cruise using the terms "all American actor," "sexiest man alive," "mission impossible," or "great smile," etc. By allowing the user to submit open ended tags, the guidance application encourages the user to creatively and prolifically submit tags for the media information provided through the guidance application system. All of the user submitted tags for a piece of media information may be stored with the corresponding piece of media information or may be stored in a file associated with the media information, for example, in data server 314 of FIG. 3. The user applied tags may be filtered using a text searching application that finds the most frequently applied tags. The searching application may have the ability to filter out singular submissions and produce a number of core tags. The text searching application may also have the ability to find shorter common phrases within longer tag submissions. For example, the tag "all American man" and "all American boy" and "all American guy" may be filtered to produce the tag "all American." Accordingly, upon filtering the numerous user submitted tags, a group of core tags may be selected by the guidance application and applied to the piece of media information. In another approach, predefined tags may be supplied by the guidance application that the user may be prompted to choose from. This approach simplifies task of filtering tags to arrive at the core tags and eliminates the vagaries of open ended user submissions.

User tags may be applied to any suitable piece of media information. For example, tags may be submitted for media programs and listings, celebrities, audio and video files, photographs, newspaper or magazine articles, etc. In one suitable approach, the core user applied tags may be applied to the media information in parallel with system defined search objects. For example, the photograph of Tom Cruise may be tagged by the system with the search object "Tom Cruise" and the user submitted tag "all American." Subsequently, if a user enters a search term matching one of the user applied tags, then the guidance application may perform a search object based query through the media information for that tag (or search object), as previously discussed with system defined search object queries. In another suitable approach, the user applied tags may be kept separate from any system defined search object tags. The user may then initiate a "User Tag Search" that only searches for media information having user applied tags matching the entered search expression.

In addition, or instead of receiving user-specified tags, the system may automatically or passively tag a piece of media information. In some embodiments, if a user, while viewing a first piece of media information, searches or navigates to another piece of information, the system may associate the tag for the other piece of media information with the first piece of media information. Conversely, the system may also associate the tag for the first piece of media information with the other piece of media information. The system may wait until a threshold number of users have searched or navigated to the other piece of information before associating the tag. As an example, a user may be on the Mission Impossible III page, and from that page search for the television program Lost, which shares the same writer/director, J. J. Abrams, with Mission Impossible III. Once enough users have searched for Lost from the Mission Impossible III page, the system may passively tag the Mission Impossible III page with the tag for Lost. To prevent the system from tagging completely unrelated topics or pieces of media information (e.g., dinosaurs and Mission Impossible III), editorial review may be necessary to protect the integrity of the tagging system.

The various tags discussed above may be assigned different weights to indicate the degree of relevance of each tag with respect to the tagged media information. For example, the Mission Impossible III page may have a larger weight for the tag "MI:III" than the Lost page. In some embodiments, tags that are passively created by user interactions with the system may automatically be assigned a lower weight than user submitted core tags or editorially generated tags. The weight for the passive tags may also be related to the number of users who searched for the other media information (e.g., the more users search for Lost from the Mission Impossible III page, the larger the weight for Lost). The system may use the weights to determine the order in which media information is displayed (e.g., information with larger weight is displayed first).

As shown in FIG. 16, a search option icon 1601 may be displayed on screen 1600 adjacent to the search interface 450/460 that provides the user with a selection box 1610 for choosing between a text search, a search object based query, and a search for user applied tags.

Figure 17:
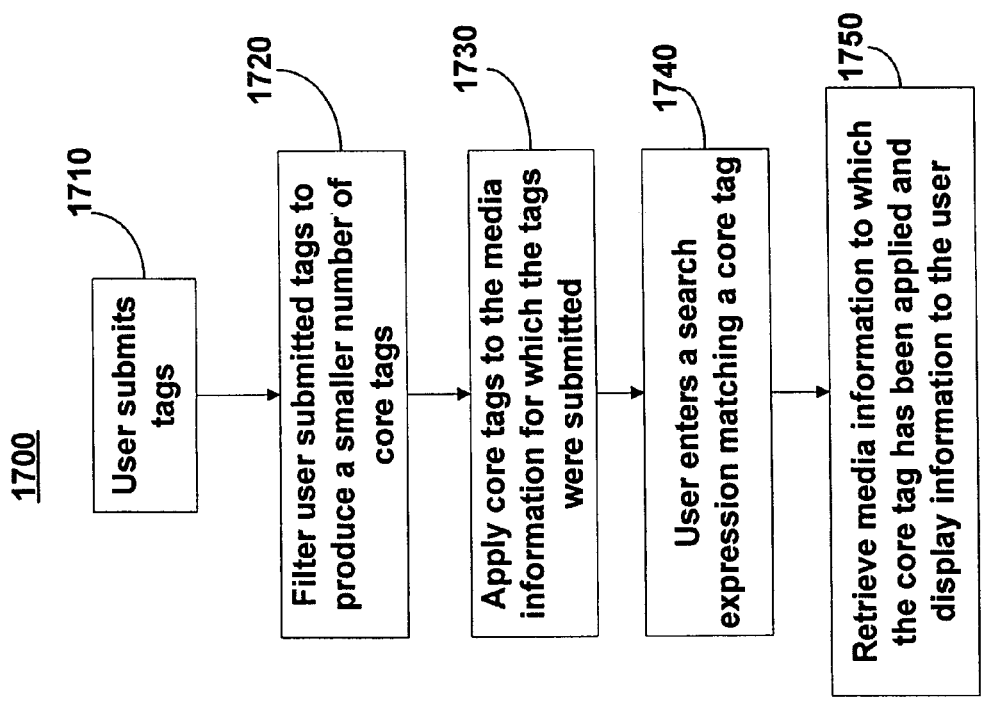
FIG. 17 is an illustrative flow chart for performing a search with user tags in accordance with one embodiment of the present invention.

FIG. 17 is a flow chart showing how searching with user applied tags is enabled in accordance with the present invention. At step 1710, tags are submitted by the user using, for example, the interface illustrated in FIG. 15. The user submitted tags are then collected and filtered at step 1720 to produce a smaller number of core tags. For example, only the most popular user submitted tags may be selected by the guidance application as core tags. User submitted tags may also be searched for shorter nested phrases, which may also serve as the basis for core tags. At step 1730, the core tags are applied to the piece of media information for which the tags were submitted. In one approach, the user submitted tags may be applied to media information in parallel with system defined search object tags. In another approach, the user submitted tags may be kept separate from such system defined tags. At step 1740, the user enters a search expression matching a core tag. The media information to which the core tag has been applied is then retrieved and displayed to the user at step 1750.

In another aspect of the present invention, the guidance application may provide the user with a search feature that offer multiple context settings for search objects. For example, a user may select a language or cultural context setting for the search feature. Once a context setting is selected, the search feature may only provide media information having the search object with the correct context modifier. Context modifiers may be attached to a search object, and may not required when entering a search expression (e.g., into text box 450). However, the guidance application may retrieve the context modifier from a user selection of the context setting. For example, the term "football" in an American context represents the sport of American football. In other cultural contexts (e.g., Spanish-speaking, European), the term "football" may be understood as the game Americans call soccer. Therefore, two separate search objects, "football" and "football [A]" may be defined by the guidance application to capture both concepts, whereby the latter search object stands for what Americans call soccer. In one approach, the context modifier "[A]" need not be entered by the user when providing the search expression. Rather, the guidance application may automatically append the context modifier to the search expression by scanning the context setting of the requested search.

Figure 18:
FIG. 18 is an illustrative display screen of a page for selecting the context of a search in accordance with one embodiment of the present invention.

As shown in FIG. 18, the user may set the context setting through selection box 1810, which may be displayed upon user selection of context icon 1801. User selection of "Spanish" or "English" in box 1810 may set the context of any search object queries initiated through interface 450/460. Alternatively, if the user has chosen to view a guidance application display page dedicated to programming of interest to the Spanish speaking community, then the search language context may be automatically set to Spanish. The context-specific searching feature of the present invention enables the guidance application to create alternate sets of search objects (i.e., two separate "football" search objects) and expands the amount of media information that can be provided to the user. That is, although the same search expression may be entered by the user, the guidance application may look to the context setting and provide the user with the search object query that corresponds with the proper context. Context sensitive searching may also be applied to atomic searches. For example, if "football" is entered in the English language context, then the atomic search result page for American football may be displayed. If "football" is entered in the Spanish language context, then the atomic search page result for European football (i.e., "soccer") may be displayed to the user. It should be understood that the use of context settings in the present invention is not limited to language or cultural contexts. The search application may offer multiple contexts based on any suitable categorization of search objects. For example, the guidance application may offer theme based contexts such as, sports, music, movies, etc. For example, the user entered search expression "Michael Jackson" in the sports context may correspond to the search object "Michael Jackson [S]," a wide receiver who played for the Cleveland Browns football club. However, in the music context, the user entered search term "Michael Jackson" may correspond to the search object "Michael Jackson [M]," the famous pop singer. In one approach, each context setting may have a full set of search objects that are mutually exclusive of search objects defined for a different context setting. In another approach, context settings may only be necessary when the same search expression matches multiple search objects defined for different context settings, in which case context modifiers may be used to decide which search object query is performed.

Figure 19:
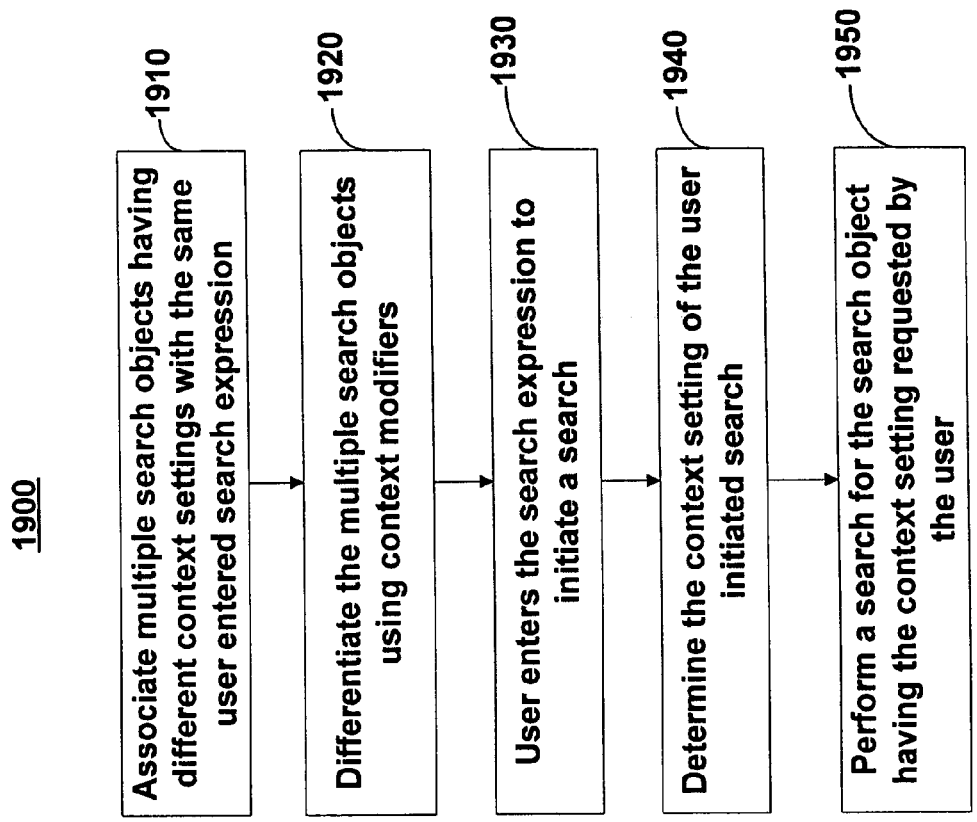
FIG. 19 is an illustrative flow chart for performing a context-sensitive search.

FIG. 19 is a flow chart of illustrative steps for providing a context sensitive search object query in accordance with the present invention. At step 1910 multiple search objects with different context settings are defined and associated with the same user entered search expression. For example, the search objects "Michael Jackson" the pop singer and "Michael Jackson" the football player may be defined having music and sports context settings, respectively, and are both associated with the same user entered search term "Michael Jackson." At step 1920, the multiple search objects are differentiated using context modifiers. For example, Michael Jackson the pop singer is differentiated with the context modifier "[M]" and the football player by the same name is differentiated with the context modifier "[S]." The user enters the common search expression at step 1930 (e.g., by text entry using interface 450/460). The guidance application then determines the context setting of the search initiated by the user at step 1940. For example, the context setting may be explicitly set by the user (e.g., using interface 1801/1810) or may be implicitly set by the guidance application depending on the context of the display page being viewed by the user at the time the search request is entered. Once the correct context setting for the search is determined, the guidance application performs a search using the search object having the appropriate context setting. That is, a query of media information using the search object "Michael Jackson [S]" is performed when the user enters the search expression "Michael Jackson" and the search context is set to sports.

It should be understood that the foregoing description is merely illustrative of the principles of the present invention and various modifications can be made by those skilled in the art without departing from the scope and spirit of the present invention.

What is claimed is:

1. A method for searching media information in an interactive media guidance application comprising:
   providing a collection of the media information, wherein the media information is organized in a plurality of categories;
   providing a database of search terms, wherein the search terms are relevant to the media information, and wherein the search terms differ from the plurality of categories;
   associating the media information with at least one of the search terms in the database;
   receiving a search expression from a user;
   determining whether the search expression matches one of the search terms in the database;
   when the search expression matches one of the search terms in the database, identifying media information that is associated with the matching search term;
   displaying the media information identified; and
   grouping the displayed media information according to the plurality of categories.

2. The method of claim 1 wherein the plurality of categories comprise media program listings, media programming information, and celebrity information.

3. The method of claim 1 further comprising:
   querying the user whether to perform a search term-based search or a text-based search using the search expression; and
   receiving a user indication to perform a search term-based search.

4. The method of claim 1 further comprising:
   querying the user whether to perform a search term-based search or a text-based search using the search expression;
   receiving a user indication to perform a text-based search;
   identifying media information that includes the text of the search expression; and
   displaying the identified media information to the user.

5. The method of claim 1, wherein the interactive media guidance application is an interactive program guide.

6. The method of claim 1, wherein the media program listings are television program listings.

7. The method of claim 1 wherein receiving search expression from a user comprises receiving search expression from a user over an Internet communications link.

8. The method of claim 1 wherein displaying identified media information comprises:
   providing the identified media information to the user over an Internet communications link; and
   displaying the media information on the user's device.

9. The method of claim 1 wherein providing a database of search terms comprises at least one of automatically and editorially defining search terms.

10. The method of claim 1 wherein associating the media information with the at least one related search term in the database comprises at least one of automatically and editorially associating the media information with the at least one related search term.

11. A method for searching media information in an interactive media guidance application comprising:
    providing a database of search terms related to the media information, wherein the media information is organized in a plurality of categories;
    associating each piece of media information with at least one of the search terms in the database;
    defining a plurality of atomic search algorithms for different search expressions each based on both a user's interest and editorial input, wherein each of the atomic search algorithms performs a plurality of unique searches using a different one of the search terms in the database;
    receiving an input from the user matching one of the search expressions;
    executing the atomic search algorithm associated with the search expression that matches the user input;
    identifying media information based on the executed atomic search algorithm; and
    displaying the identified media information; and
    grouping the displayed media information according to the plurality of categories.

12. The method of claim 11 wherein defining an atomic search algorithm comprises associating a plurality of search terms in the database with the search expression.

13. The method of claim 11 wherein defining the atomic search algorithms comprises associating a text string with the search expression, and wherein identifying media information based on the executed atomic search algorithm comprises identifying media information based on the text string.

14. The method of claim 11 further comprising:
    querying the user whether to perform the atomic search algorithm or a text-based search; and
    receiving a user indication to perform the atomic search algorithm.

15. The method of claim 11, wherein the interactive media guidance application is an interactive program guide.

16. The method of claim 11, wherein the media program listings are television program listings.

17. A method for searching media information in an interactive media guidance application comprising:
    receiving expressions that each include at least one word submitted by at least one user for a piece of media information, wherein the submitted expressions are related to the piece of media information, and wherein the media information corresponds to playable media, and wherein the media information is organized in a plurality of categories;
    filtering the submitted expressions to produce core tags, wherein each core tag is produced from at least two of the submitted expressions that have at least one word in common;

associating each piece of the media information with at least one of the produced core tags; receiving a search expression from the user, wherein the search expression matches one of the produced core tags;

identifying media information that is associated with the matching core tag; and displaying the identified media information to the user, wherein the displayed media information allows the user to play the playable media; and grouping the displayed media information according to the plurality of categories.

18. The method of claim 17 wherein associating each piece of the media information comprises at least one of editorially associating one of the produced core tags with the media information and automatically associating one of the produced core tags with the media information.

19. The method of claim 17 wherein receiving expressions submitted by a user for a piece of media information comprises monitoring expressions entered by a user.

20. The method of claim 17, wherein the interactive media guidance application is an interactive program guide.

21. The method of claim 17, wherein the media program listings are television program listings.

22. A method for searching media information in an interactive media guidance application comprising:

providing a database of a plurality of search terms related to the media information, wherein the media information is organized in a plurality of categories;

identifying the search terms in the database that each have a first meaning in a first context setting and a different second meaning in a second context setting;

linking each of the identified search terms with a respective first context modifier to indicate the respective first meaning;

linking each of the identified search terms with a respective second context modifier to indicate the respective different second meaning; associating the media information with a corresponding one of the context modifiers;

receiving a search expression from a user, wherein the search expression matches a first of the plurality of search terms in the database that have the first and second meanings;

retrieving the first and second context modifiers that are linked to the first search term;

determining, without further user input, a context setting of the search by reference to a display page viewed by the user;

selecting one of the retrieved first and second context modifiers that corresponds to the determined context setting; identifying media information that is associated with the first search term and the selected one of the first and second context modifiers;

displaying identified media information, and grouping the displayed media information according to the plurality of categories.

23. The method of claim 22 wherein the first context setting is a first cultural context setting and the second context setting is a second cultural context setting different from the first cultural context setting.

24. The method of claim 22, wherein the interactive media guidance application is an interactive program guide.

25. The method of claim 22, wherein the media program listings are television program listings.

26. A system for searching media information in an interactive media guidance application comprising a memory, control circuitry and a display device, the control circuitry configured to:

access a collection of the media information stored in the memory, wherein the media information is organized in a plurality of categories;

access a database of search terms stored in the memory, wherein the search terms are relevant to the media information, and wherein the search terms differ from the plurality of categories;

associate the media information with at least one of the search terms in the database;

receive a search expression from a user;

determine whether the search expression matches one of the search terms in the database;

when the search expression matches one of the search terms in the database, identify media information that is associated with the matching search term; and direct a display device to display the media information identified according to the plurality of categories.

27. The system of claim 26 wherein the plurality of categories comprise media program listings, media programming information, and celebrity information.

28. The system of claim 26 wherein the control circuitry is further configured to:

query the user whether to perform a search term-based search or a text-based search using the search expression; and receive a user indication to perform a search term-based search.

29. The system of claim 26 wherein the control circuitry is further configured to:

query the user whether to perform a search term-based search or a text-based search using the search expression;

receive a user indication to perform a text-based search;

identify media information that includes the text of the search expression; and direct the display device to display the identified media information to the user.

30. The system of claim 26, wherein the interactive media guidance application is an interactive program guide.

31. The system of claim 26, wherein the media program listings are television program listings.

32. The system of claim 26 wherein the control circuitry is further configured to receive search expression from a user over an Internet communications link.

33. The system of claim 26 wherein the control circuitry is further configured to:

provide the identified media information to the user over an Internet communications link; and direct the display device to display the media information on the user's device.

34. The system of claim 26 wherein the control circuitry is further configured to at least one of automatically and editorially define search terms in the database.

35. The system of claim 26 wherein the control circuitry is further configured to at least one of automatically and editorially associate the media information with the at least one of the search terms in the database.

36. A system for searching media information in an interactive media guidance application comprising a memory computer readable medium, control circuitry and a display device, the control circuitry configured to:

access a database of search terms stored in the memory computer readable medium wherein the search terms are related to the media information, and wherein the media information is organized in a plurality of categories;

associate each piece of media information with at least one of the search terms in the database;

define a plurality of atomic search algorithms for different search expressions each based on both a user's interest and editorial input, wherein each of the atomic search algorithms performs a plurality of unique searches using a different one of the search terms in the database;

receive an input from the user matching one of the search expressions;

execute the atomic search algorithm associated with the search expression that matches the user input;

identify media information based on the executed atomic search algorithm; and direct the display device to display the identified media information according to the plurality of categories.

37. The system of claim 36 wherein the control circuitry is further configured to associate a search term with the search expression, and identify media information associated with the search term.

38. The system of claim 36 wherein the control circuitry is further configured to associate a text string with the search expression, and identify media information based on the text string.

39. The system of claim 36 wherein the control circuitry is further configured to:

query the user whether to perform the atomic search algorithm or a text-based search; and receive a user indication to perform the atomic search algorithm.

40. The system of claim 36, wherein the interactive media guidance application is an interactive program guide.

41. The system of claim 36, wherein the media program listings are television program listings.

42. A system for searching media information in an interactive media guidance application comprising control circuitry and a display device, the control circuitry configured to:

receive expressions that each include at least one word submitted by at least one user for a piece of media information, wherein the submitted expressions are related to the piece of media information, and wherein the media information corresponds to playable media, and wherein the media information is organized in a plurality of categories;

filter the submitted expressions to produce core tags, wherein each core tag is produced from at least two of the submitted expressions that have at least one word in common;

associate each piece of the media information with at least one of the produced core tags;

receive a search expression from a user, wherein the search expression matches one of the produced core tags; identify media information that is associated with the matching core tag; and direct the display device to display the identified media information to the user according to the plurality of categories, wherein the displayed media information allows the user to play the playable media.

43. The system of claim 42 wherein the control circuitry is further configured to at least one of editorially associate one of the produced core tags with the media information and automatically associate one of the produced core tags with the media information.

44. The system of claim 42 wherein the control circuitry is further configured to monitor expressions entered by a user.

45. The system of claim 42, wherein the interactive media guidance application is an interactive program guide.

46. The system of claim 42, wherein the media program listings are television program listings.

47. A system for searching media information in an interactive media guidance application comprising a memory computer readable medium, control circuitry and a display device, the control circuitry configured to:

access a database of a plurality of search terms related to the media information, wherein the media information is organized in a plurality of categories;

identify the search terms in the database that each have a first meaning in a first context setting and different second meaning in a second context setting;

link each of the identified search terms with a respective first context modifier to indicate the respective first meaning;

link each of the identified search terms with a respective second context modifier to indicate the respective different second meaning;

associate the media information with a corresponding one of the context modifiers;

receive a search expression from a user, wherein the search expression matches a first of the plurality of search terms in the database that have the first and second meanings;

retrieve the first and second context modifiers that are linked to the first search term;

determine, without further user input, a context setting of the search by reference to a display page viewed by the user; selecting one of the retrieved first and second context modifiers that corresponds to the determined context setting;

identify media information that is associated with the first search term and the selected one of the first and second context modifiers; and direct the display device to display identified media information according to the plurality of categories.

48. The system of claim 47 wherein the first context setting is a first cultural context setting and the second context setting is a second cultural context setting different from the first cultural context setting.

49. The system of claim 47, wherein the interactive media guidance application is an interactive program guide.

50. The system of claim 47, wherein the media program listings are television program listings.

* * * * *